US012621109B2

(12) United States Patent
Landis et al.

(10) Patent No.: US 12,621,109 B2
(45) Date of Patent: May 5, 2026

(54) ML BASED DYNAMIC BIT LOADING AND RATE CONTROL

(71) Applicant: QUALCOMM Incorporated, San Diego, CA (US)

(72) Inventors: Shay Landis, Hod Hasharon (IL); Amit Bar-Or Tillinger, Tel-Aviv (IL); Yehonatan Dallal, Kfar Saba (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 18/338,265

(22) Filed: Jun. 20, 2023

(65) Prior Publication Data

US 2024/0430062 A1     Dec. 26, 2024

(51) Int. Cl.
*H04L 5/00*          (2006.01)
*G06N 3/084*         (2023.01)
*H04W 72/02*         (2009.01)

(52) U.S. Cl.
CPC ........... *H04L 5/0053* (2013.01); *G06N 3/084* (2013.01); *H04W 72/02* (2013.01)

(58) Field of Classification Search
CPC ...... H04L 5/0053; G06N 3/084; H04W 72/02
See application file for complete search history.

(56) References Cited

U.S. PATENT DOCUMENTS

2023/0342593 A1*  10/2023  Sun ..................... H04L 25/0224
2024/0106508 A1*   3/2024  Tang ..................... H04L 1/0029

* cited by examiner

*Primary Examiner* — Won Tae C Kim
(74) *Attorney, Agent, or Firm* — Procopio, Cory, Hargreaves & Savitch LLP

(57)          ABSTRACT

Apparatuses and methods for ML based dynamic bit loading and rate control are described. An apparatus obtains NN model coefficient information associated with communication channel information, between a UE and network, and the UE capabilities. The apparatus generates, using the NN model and based on the coefficient information, a communication configuration including a constellation or a CB channel coding rate. The apparatus communicates, with the network and based on the CB of a TB, using the NN-generated channel coding rate or constellation. Another apparatus obtains NN model coefficient information, associated with communication channel information, between a UE and network, and the UE capabilities. The apparatus generates, using the NN model and based on the coefficient information, a communication configuration including a constellation or a CB channel coding rate. The apparatus communicates, with the UE and based on the CB of a TB, using the NN-generated channel coding rate or constellation.

26 Claims, 15 Drawing Sheets

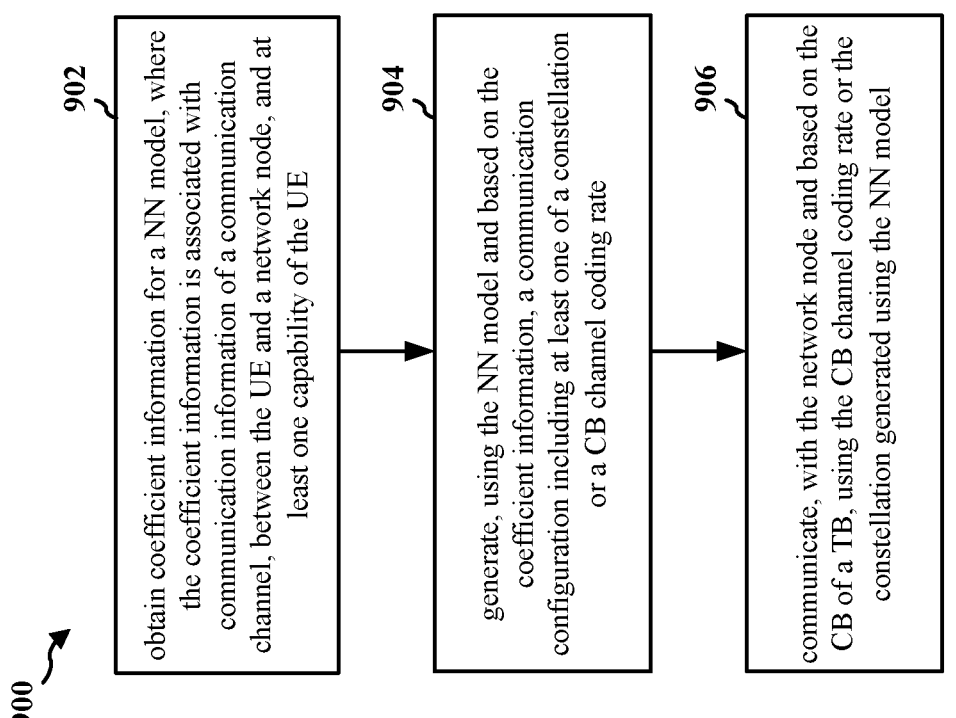

900

902 obtain coefficient information for a NN model, where the coefficient information is associated with communication information of a communication channel, between the UE and a network node, and at least one capability of the UE

904 generate, using the NN model and based on the coefficient information, a communication configuration including at least one of a constellation or a CB channel coding rate

906 communicate, with the network node and based on the CB of a TB, using the CB channel coding rate or the constellation generated using the NN model

FIG. 9

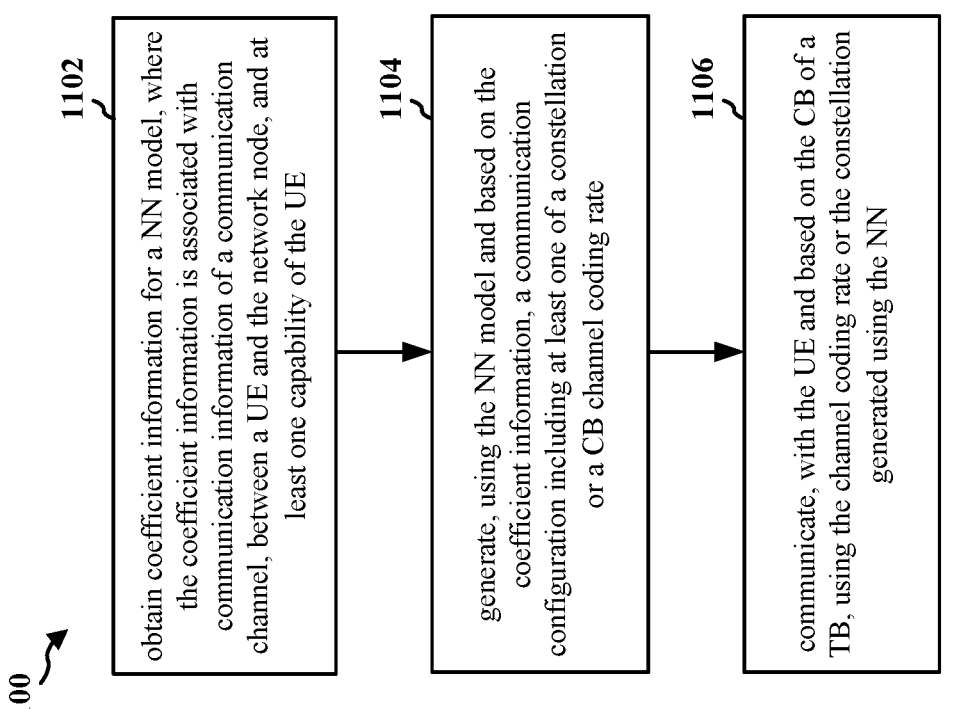

1100

1102 obtain coefficient information for a NN model, where the coefficient information is associated with communication information of a communication channel, between a UE and the network node, and at least one capability of the UE 1104 generate, using the NN model and based on the coefficient information, a communication configuration including at least one of a constellation or a CB channel coding rate 1106 communicate, with the UE and based on the CB of a TB, using the channel coding rate or the constellation generated using the NN

FIG. 11

ML BASED DYNAMIC BIT LOADING AND RATE CONTROL

TECHNICAL FIELD

The present disclosure relates generally to communication systems, and more particularly, to wireless communications utilizing bit loading and channel coding rates.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is configured to obtain coefficient information for a neural network (NN) model, where the coefficient information is associated with communication information of a communication channel, between the UE and a network node, and at least one capability of the UE. The apparatus is configured to generate, using the NN model and based on the coefficient information, a communication configuration including at least one of a constellation or a code block (CB) channel coding rate. The apparatus is configured to communicate, with the network node and based on the CB of a transport block (TB), using the CB channel coding rate or the constellation generated using the NN model.

In the aspect, the method includes obtaining coefficient information for a NN model, where the coefficient information is associated with communication information of a communication channel, between the UE and a network node, and at least one capability of the UE. The method includes generating, using the NN model and based on the coefficient information, a communication configuration including at least one of a constellation or a CB channel coding rate. The method includes communicating, with the network node and based on the CB of a TB, using the CB channel coding rate or the constellation generated using the NN model.

In another aspect of the disclosure, a method, a computer-readable medium, and an apparatus are provided. The apparatus is configured to obtain coefficient information for a NN model, where the coefficient information is associated with communication information of a communication channel, between a UE and the network node, and at least one capability of the UE. The apparatus is configured to generate, using the NN model and based on the coefficient information, a communication configuration including at least one of a constellation or a CB channel coding rate. The apparatus is configured to communicate, with the UE and based on the CB of a TB, using the channel coding rate or the constellation generated using the NN.

In the aspect, the method includes obtaining coefficient information for a NN model, where the coefficient information is associated with communication information of a communication channel, between a UE and the network node, and at least one capability of the UE. The method includes generating, using the NN model and based on the coefficient information, a communication configuration including at least one of a constellation or a CB channel coding rate. The method includes communicating, with the UE and based on the CB of a TB, using the channel coding rate or the constellation generated using the NN.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 9 is a flowchart of a method of wireless communication, in accordance with various aspects of the present disclosure.

FIG. 11 is a flowchart of a method of wireless communication, in accordance with various aspects of the present disclosure.

DETAILED DESCRIPTION

Figure 1:
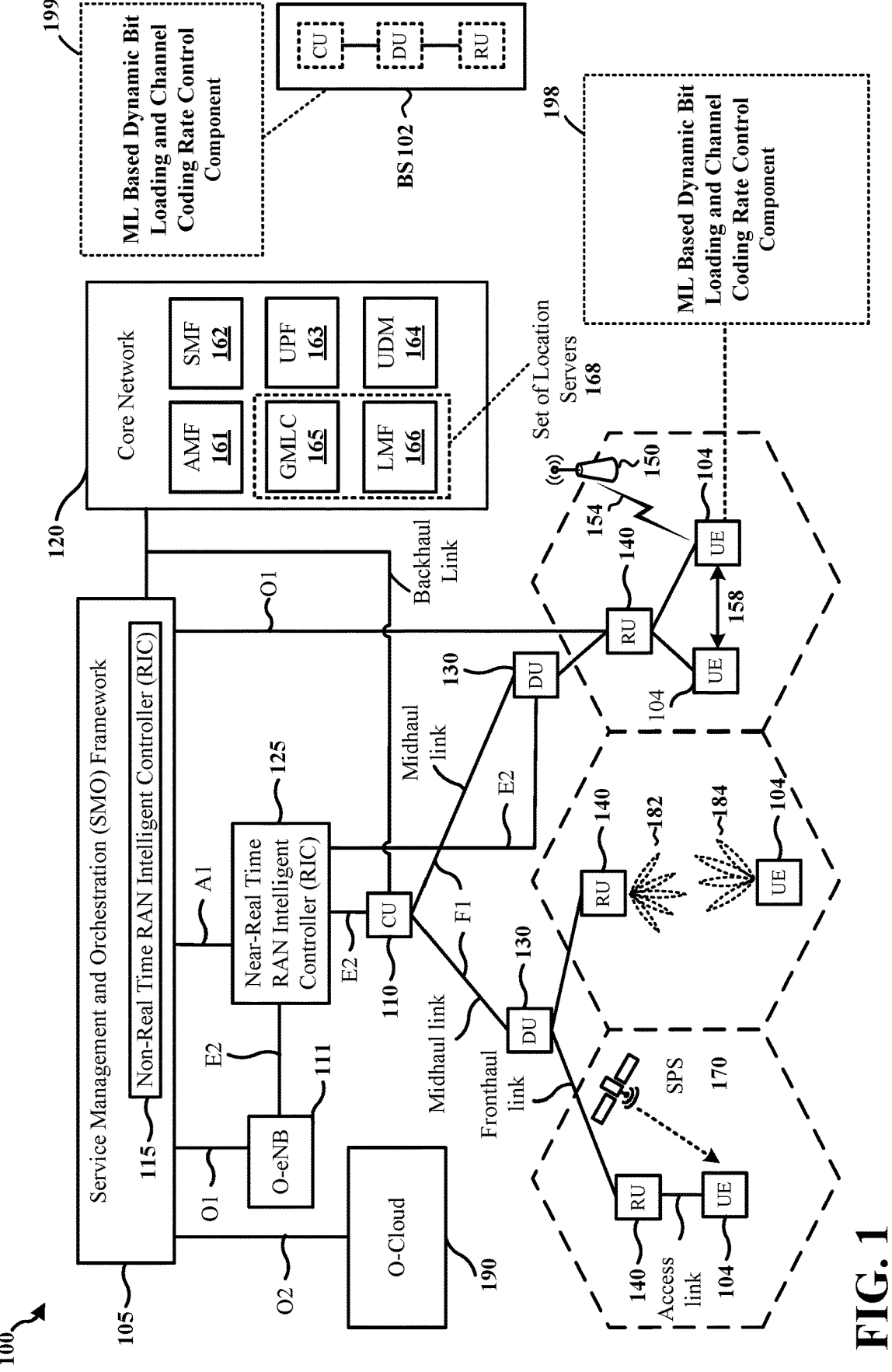
FIG. 1 is a diagram illustrating an example of a wireless communications system and an access network.

Wireless communication may utilize bit loading and channel coding rates for data. For instance, there may be up to two TBs or one TB when number of layers is smaller than or equal to four. In such configurations, each TB may be partitioned to CBs that have the same constellation and the same channel coding rate. This information may be indicated to a UE by the modulation and coding scheme (MCS) using downlink control information (DCI) scheduling the transmission.

However, using the same constellation and channel code rate for each CB of a given TB may not be optimal, yet may provide a balance between performance and signaling overhead. Controlling the constellation as a function of the channel and/or control of the channel code rate may increase complexity for a receiver. As one example, a receiver may account for many variables, including but not limited to, instantaneous channels per resource element (RE), decoder implementation details, overall achievable rates considering all REs inside a CB, interlayer interference between different layers as a function of different constellation selections, and/or the like.

Aspects presented herein provide for deep-learning. NN, or machine learning based selection of constellation and/or coding rate. Aspects provide for a model to be used at the transmitter and the receiver, e.g., the network and the UE, with the communication of model coefficients between the transmitter and the receiver so that the transmitter and receiver may identify a constellation and/or coding rate based on channel conditions while avoiding increased overhead. Various aspects relate generally to bit loading and channel coding rates. Some aspects more specifically relate to ML based dynamic bit loading and channel coding rate control. In one example, a UE may be configured to obtain coefficient information for a NN model, where the coefficient information is associated with communication information of a communication channel, between the UE and a network node, and at least one capability of the UE. The UE may be configured to generate, using the NN model and based on the coefficient information, a communication configuration including at least one of a constellation or a CB channel coding rate. The UE may be configured to communicate, with the network node and based on the CB of a TB, using the CB channel coding rate or the constellation generated using the NN model. The UE may be configured to transmit, to the network node, an indication of support for the at least one capability of the UE, where the at least one capability of the UE includes a capability of the UE associated with an optimization or a restriction for execution of the NN model. The UE may be configured to receive, from the network node using second radio resource control (RRC) signaling, updated coefficient information for the NN model. The UE may be configured to transmit, for the network node and subsequent to obtaining the coefficient information for the NN model, the coefficient information associated with the NN model. In another example, a network node (e.g., a base station) may be configured to obtain coefficient information for a NN model, where the coefficient information is associated with communication information of a communication channel, between a UE and the network node, and at least one capability of the UE. The network node may be configured to generate, using the NN model and based on the coefficient information, a communication configuration including at least one of a constellation or a CB channel coding rate. The network node may be configured to communicate, with the UE and based on the CB of a TB, using the channel coding rate or the constellation generated using the NN. The network node may be configured to receive, from the UE, an indication of support for the at least one capability of the UE, where the at least one capability of the UE includes a capability of the UE associated with an optimization or a restriction for execution of the NN model. The component 199 may be configured to transmit the coefficient information for the NN model, for the UE and subsequent to obtaining the coefficient information for the NN model, using first RRC signaling. The network node may be configured to transmit, for the UE using second RRC signaling, updated coefficient information for the NN model.

Particular aspects of the subject matter described in this disclosure can be implemented to realize one or more of the following potential advantages. In one example, by using deep-learning based selections of bit loading and dynamic channel code rates, the described techniques can be used to increase spectral efficiency and granularity of CB channel coding rate per CB, as well as of constellations for each layer of multiple layers, for each RE of multiple REs, for each resource block (RB) of multiple RBs, and/or for each physical resource block group (PRG) of multiple PRGs. In another example, by adapting NN-based implementations and training for bit loading and channel coding rate control, the described techniques can be used to optimize receiver performance based on channel conditions while minimizing the signaling impact and latency of such signaling. In an additional example, by communicating NN coefficients between a transmitter and a receiver, the described techniques can be used for cross-training of the network side, as well as for reductions of the signaling overhead and latency.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-cNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHZ-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHz), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a component 198 that may be configured to obtain coefficient information for a NN model, where the coefficient information is associated with communication information of a communication channel, between the UE and a network node, and at least one capability of the UE. The component 198 may be configured to generate, using the NN model and based on the coefficient information, a communication configuration including at least one of a constellation or a CB channel coding rate. The component 198 may be configured to communicate, with the network node and based on the CB of a TB, using the CB channel coding rate or the constellation generated using the NN model. The component 198 may be configured to transmit, to the network node, an indication of support for the at least one capability of the UE, where the at least one capability of the UE includes a capability of the UE associated with an optimization or a restriction for execution of the NN model. The component 198 may be configured to receive, from the network node using second RRC signaling, updated coefficient information for the NN model. The component 198 may be configured to transmit, for the network node and subsequent to obtaining the coefficient information for the NN model, the coefficient information associated with the NN model. In certain aspects, the base station 102 may have a component 199 that may be configured to obtain coefficient information for a NN model, where the coefficient information is associated with communication information of a communication channel, between a UE and the network node, and at least one capability of the UE. The component 199 may be configured to generate, using the NN model and based on the coefficient information, a communication configuration including at least one of a constellation or a CB channel coding rate. The component 199 may be configured to communicate, with the UE and based on the CB of a TB, using the channel coding rate or the constellation generated using the NN. The component 199 may be configured to receive, from the UE, an indication of support for the at least one capability of the UE, where the at least one capability of the UE includes a capability of the UE associated with an optimization or a restriction for execution of the NN model. The component 199 may be configured to transmit the coefficient information for the NN model, for the UE and subsequent to obtaining the coefficient information for the NN model, using first RRC signaling. The network node may be configured to transmit, for the UE using second RRC signaling, updated coefficient information for the NN model. Accordingly, aspects herein for ML based dynamic bit loading and channel coding rate control use deep-learning based selections of bit loading and dynamic channel code rates to increase spectral efficiency and granularity of CB channel coding rate per CB, as well as of constellations for each layer of multiple layers, for each RE of multiple REs, for each RB of multiple RBs, and/or for each PRG of multiple PRGs, adapt NN-based implementations and training for bit loading and channel coding rate control to optimize receiver performance based on channel conditions while minimizing the signaling impact and latency of such signaling, and communicate NN coefficients between a

13 | 14 transmitter and a receiver for cross-training of the network side, as well as for reductions of the signaling overhead and latency.

Figure 2:
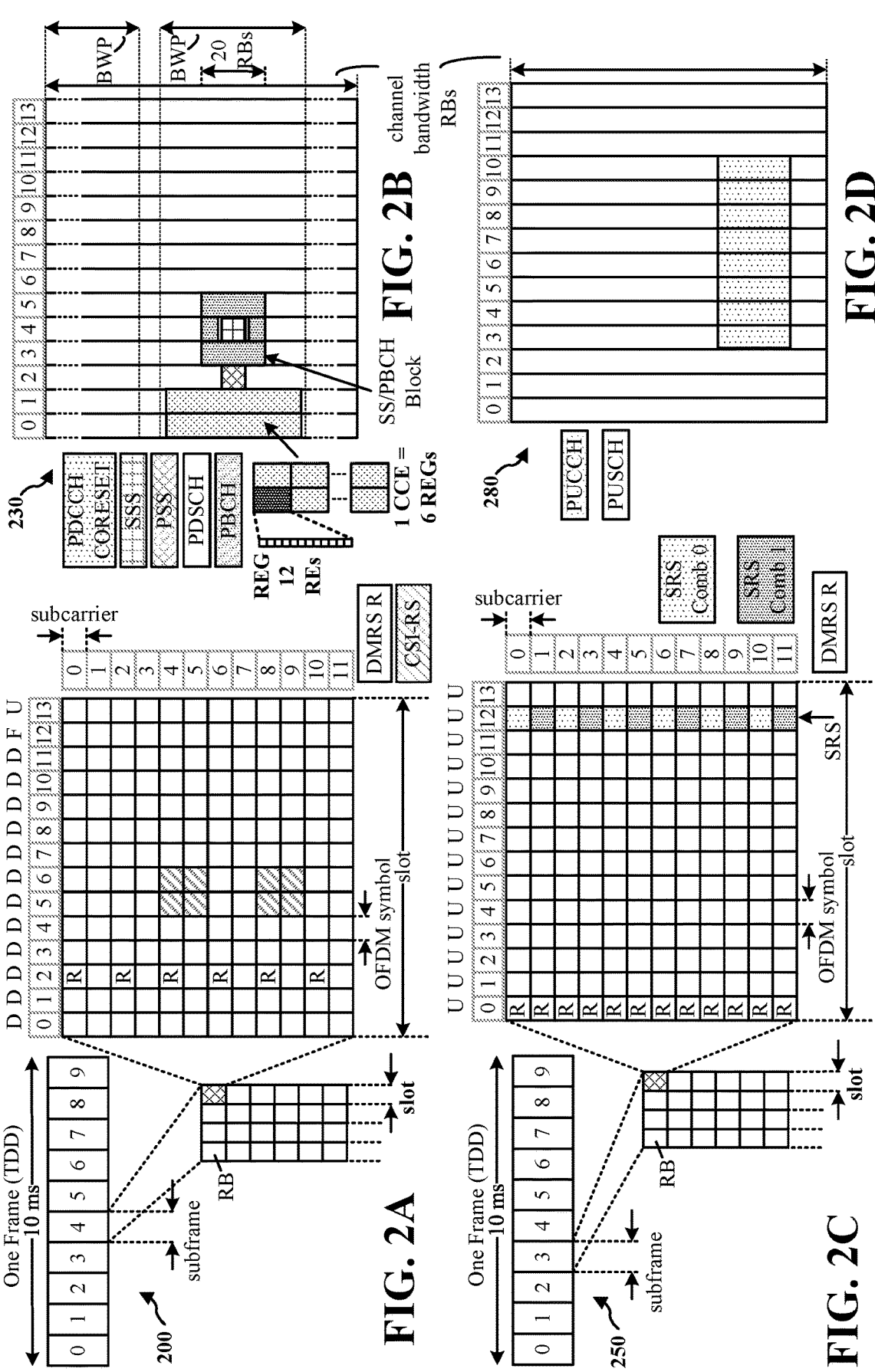
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS<br>$\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

TABLE 1-continued

Numerology, SCS, and CP

| μ | SCS<br>$\Delta f = 2^\mu \cdot 15[kHz]$ | Cyclic prefix |
|---|---|---|
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 24 slots/subframe. The subcarrier spacing may be equal to $2^\mu$*15 kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
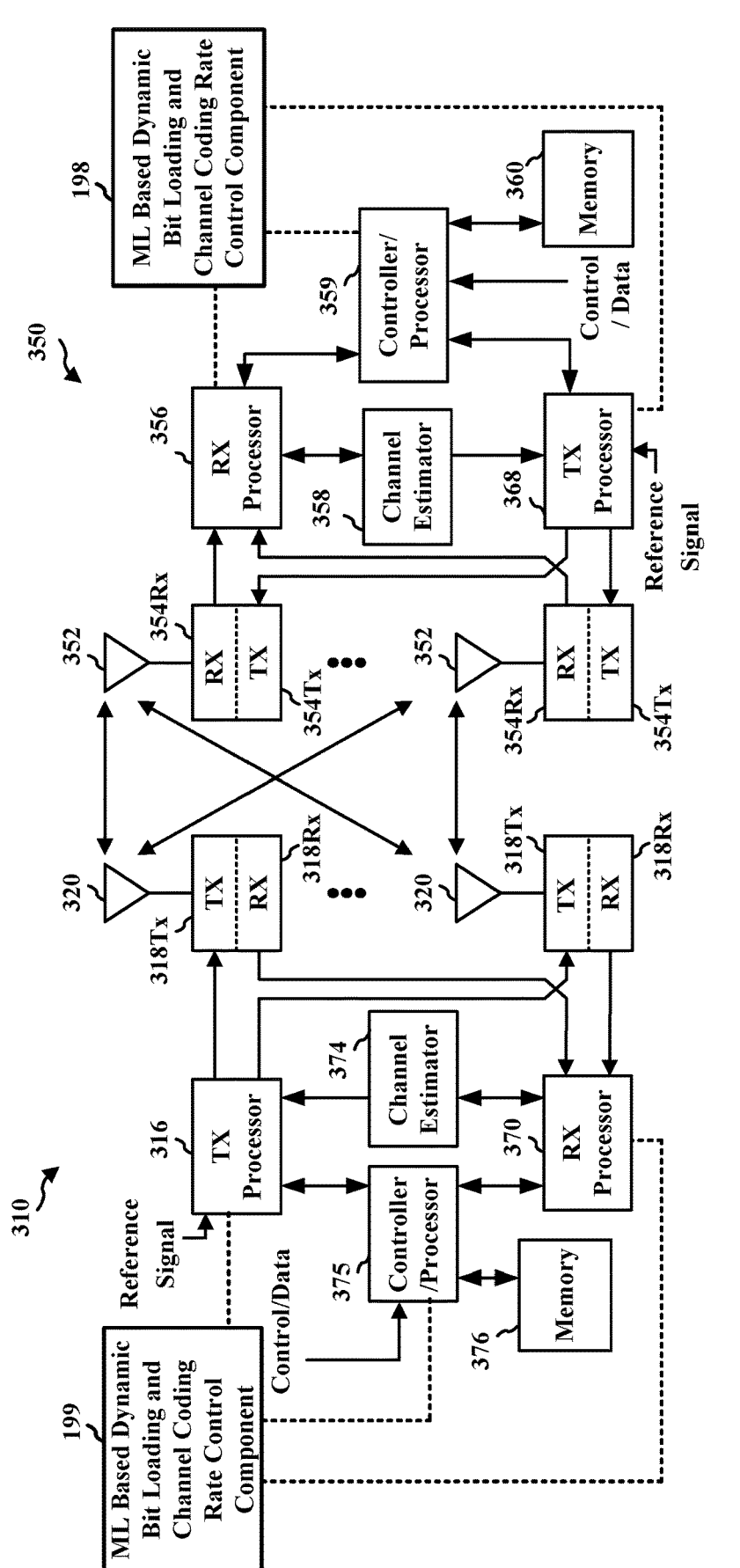
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the component 198 of FIG. 1. At least one of the TX processor 316, the RX processor 370, and the controller/processor 375 may be configured to perform aspects in connection with the component 199 of FIG. 1.

Wireless devices may use bit loading and channel coding rates for data. For instance, there may be up to two TBs or one TB when a number of layers is smaller than or equal to four. In such configurations, each TB may be partitioned into multiple CBS that have the same constellation and the same channel coding rate. This information may be indicated to a UE by the MCS using DCI, e.g., DCI scheduling the transmission. However, using the same constellation and channel code rate for all CBs of a given TB may not be optimal, yet may provide a balance between performance and signaling overhead. Added control of the constellation as a function of the channel, and/or control of the channel code rate, may increase complexity for the receiver or may involve added signaling overhead. As one example, such added control may lead a receiver to account for many variables, including but not limited to, instantaneous channels per RE, decoder implementation details, overall achievable rates considering all REs inside a CB, interlayer interference between different layers as a function of different constellation selections, and/or the like.

Aspects presented herein provide for deep-learning. NN, or machine learning based selection of constellation and/or coding rate. Aspects provide for a model to be used at the transmitter and the receiver, e.g., the network and the UE, with the communication of model coefficients between the transmitter and the receiver so that the transmitter and receiver may identify a constellation and/or coding rate based on channel conditions while avoiding increased overhead. In aspects, the model coefficients may be NN parameters learned during training sessions of NN models. The described aspects utilize deep learning methods, a NN, or other ML aspects to perform per-RE bit loading and dynamic rate control. An innovation in the aspects is allowing improved spectral efficiency by using a NN that determines dynamically a rate per CB, constellation/rank per RE, etc. The aspects herein for ML based dynamic bit loading and channel coding rate control provide for using deep-learning based selections of bit loading and dynamic channel code rates to increase spectral efficiency and granularity of CB channel coding rate per CB, as well as of constellations for each layer of multiple layers, for each RE of multiple REs, for each RB of multiple RBs, and/or for each PRG of multiple PRGs. Aspects also provide for adapting NN-based implementations and training for bit loading and channel coding rate control to optimize receiver performance based on channel conditions while minimizing the signaling impact and latency of such signaling. Aspects further provide for communicating NN coefficients between a transmitter and a receiver for cross-training of the network side, as well as for reductions of the signaling overhead and latency.

Figure 15:
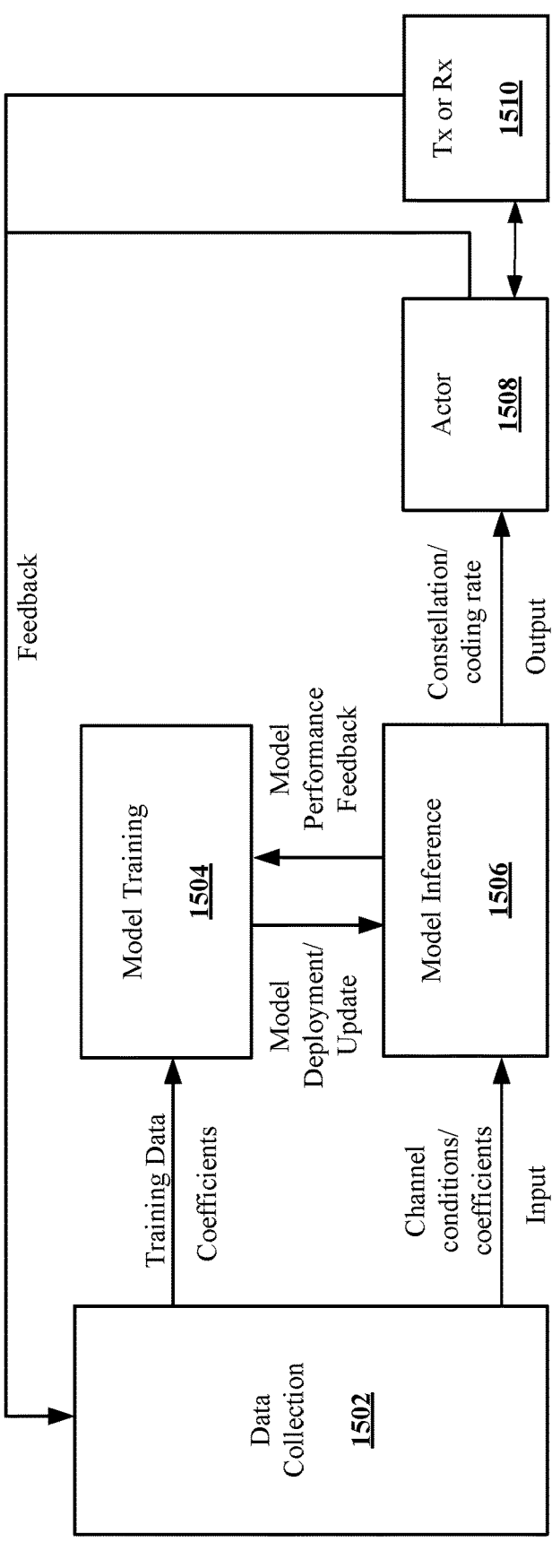
FIG. 15 illustrates examples aspects of model training and model inference in accordance with aspects of the present disclosure.

FIG. 15 is an example of the ML/AI/NN algorithm 1500 of a method of wireless communication and illustrates various aspects model training, model inference, model feedback, and model update. The ML/AI/NN algorithm 1500 may include various functions including a data collection 1502, a model training function 1504, a model inference function 1506, and an actor 1508.

The data collection 1502 may be a function that provides input data to the model training function 1504 and the model inference function 1506. The data collection 1502 function may include any form of data preparation, and it may not be specific to the implementation of the ML/AI/NN algorithm (e.g., data pre-processing and cleaning, formatting, and transformation).

The examples of input data may include, but are not limited to, measurements, such as measurements, encoding results, decoding results, or other feedback, from entities including UEs or network nodes, feedback from the actor 1508 (e.g., which may be a UE or network node), output from another ML/AI/NN model. The data collection 1502 may include training data, which refers to the data to be sent as the input for the model training function 1504, and inference data, which refers to be sent as the input for the model inference function 1506. As part of the training data, coefficient information may be exchanged between a transmitter and a receiver, e.g., as described in connection with 507 in FIG. 5, so that a model maintained at transmitter and a model maintained at a receiver can use the same or similar coefficients to use channel conditions to determine a constellation and/or coding rate for CBs of a TB.

The model training function 1504 may be a function that performs the ML model training, validation, and testing, which may generate model performance metrics as part of the model testing procedure. The model training function 1504 may also be responsible for data preparation (e.g., data pre-processing and cleaning, formatting, and transformation) based on the training data delivered or received from the data collection 1502 function. The model training function 1504 may deploy or update a trained, validated, and tested ML/AI/NN model to the model inference function 1506, and receive a model performance feedback from the model inference function 1506. Other devices may also provide feedback, such as a transmitter and/or receiver 1510 involved in wireless communication with the actor 1508. As described above, there may be various functionalities to be performed by an ML/AI/NN model for wireless communication The model inference function 1506 may be a function that provides the ML/AI/NN model inference output (e.g., predictions or decisions). The model inference function 1506 may also perform data preparation (e.g., data pre-processing and cleaning, formatting, and transformation) based on the inference data delivered from the data collection 1502 function. The output of the model inference function 1506 may include the inference output of the ML/AI/NN model produced by the model inference function 1506. The details of the inference output may be use case specific. As an example, the output may include a constellation or a beam prediction for beam management. The output may be for the transmitter or the receiver (e.g. a network or a UE). For example, if the actor is the transmitter, the actor 1508 may then use the constellation and/or coding rate to transmit to a receiver. If the actor is the receiver, the actor 1508 may then use the constellation and/or coding rate to receive communication from a transmitter. In some aspects, the actor may be a component of the base station or a network entity. In other aspects, the actor may be a UE in communication with a wireless network.

The model performance feedback may refer to information derived from the model inference function 1506 that may be suitable for the improvement of the AI/ML model trained in the model training function 1504. The feedback from the actor 1508 or other network entities (via the data collection 1502 function) may be implemented for the model inference function 1506 to create the model performance feedback.

The actor 1508 may be a function that receives the output from the model inference function 1506 and triggers or performs corresponding actions. The actor may trigger actions directed to network entities including the other network entities or itself. The actor 1508 may also provide a feedback information that the model training function 1504 or the model inference function 1506 to derive training or inference data or performance feedback. The feedback may be transmitted back to the data collection 1502.

The network may use machine-learning algorithms, deep-learning algorithms, neural networks, reinforcement learning, regression, boosting, or advanced signal processing methods for aspects of wireless communication including the various functionalities such as beam management, CSF, or positioning, among other examples.

In some aspects described herein, the network may train one or more neural networks to learn the dependence of measured qualities on individual parameters. Among others, examples of machine learning models or neural networks that may be included in the network entity include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; bayesian networks; genetic algorithms; Deep convolutional networks (DCNs) configured with additional pooling and normalization layers; and Deep belief networks (DBNs).

A machine learning model, such as an artificial neural network (ANN), may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model may include multiple layers and/or operations that may be formed by the concatenation of one or more of the referenced operations. Examples of operations that may be involved include extraction of various features of data, convolution operations, fully connected operations that may be activated or deactivated, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution AxB operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., any feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model. An output of one node is connected as the input to another node. Connections between nodes may be referred to as edges, and weights may be applied to the connections/edges to adjust the output from one node that is applied as input to another node. Nodes may apply thresholds in order to determine whether, or when, to provide output to a connected node. The output of each node may be calculated as a non-linear function of a sum of the inputs to the node. The neural network may include any number of nodes and any type of connections between nodes. The neural network may include one or more hidden nodes. Nodes may be aggregated into layers, and different layers of the neural network may perform different kinds of transformations on the input. A signal may travel from input at a first layer through the multiple layers of the neural network to output at the last layer of the neural network and may traverse layers multiple times.

Figure 4:
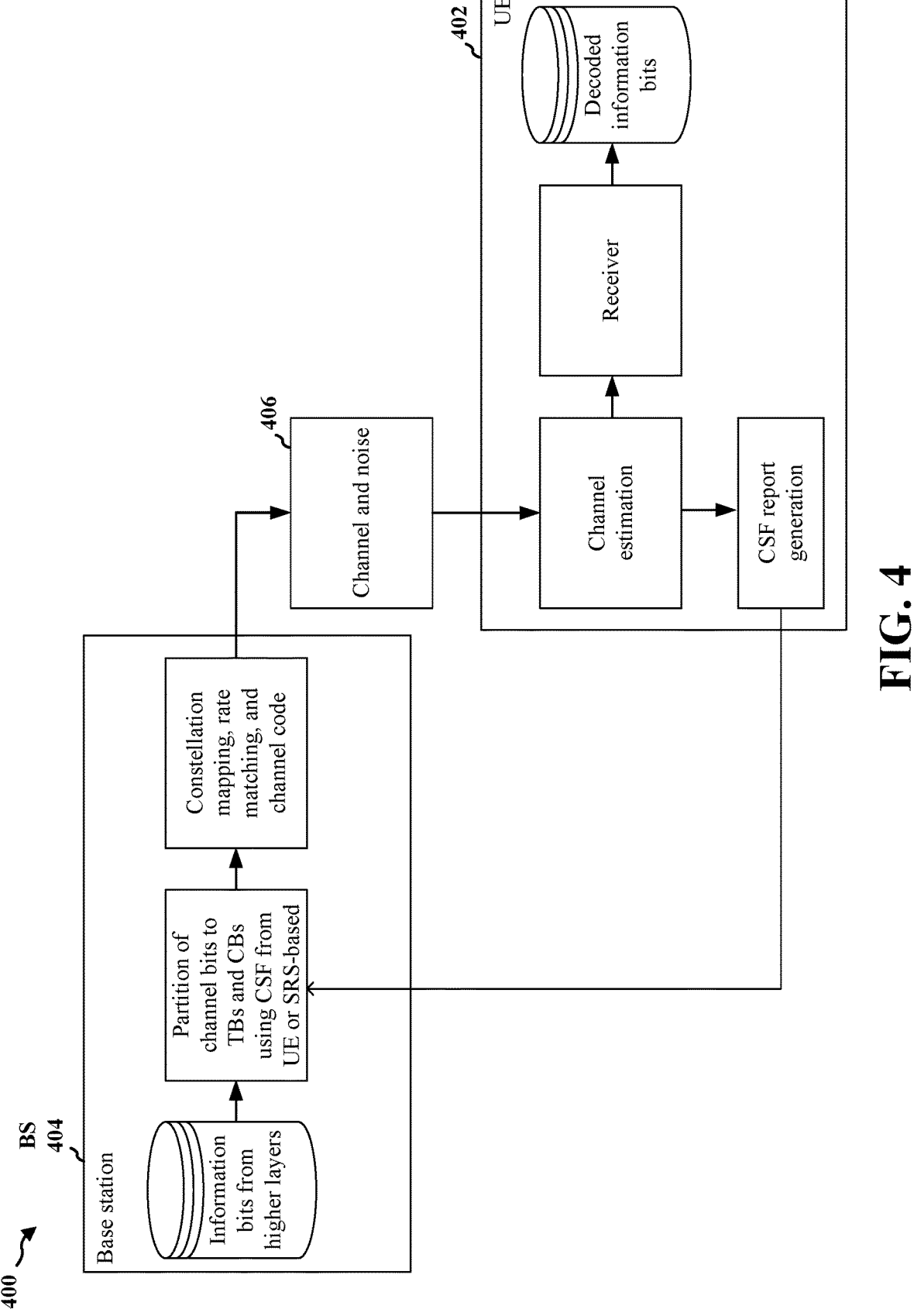
FIG. 4 is a diagram illustrating an example of bit loading and rate control.

FIG. 4 is a diagram 400 illustrating an example of bit loading and rate control. Diagram 400 shows a UE 402 and a base station 404 that may communicate (e.g., DL) using a channel 406 that may introduce noise into communications. The base station 404 may select one constellation for each TB and the same coding rate for all the CBs inside the TB. This partition may be based on the channel state feedback (CSF) report of the UE and/or UE transmissions of SRS.

For instance, the base station 404 may take information bits from higher layers and partition such bits for the channel 406 to TBs and CBs using the CSF or SRS from the UE 402. The base station 404 may perform constellation mapping, rate matching, and channel coding for the partitioned TBs/CBs, and may transmit the processed partitions/data over the channel 406 that may introduce noise into the communication.

The UE 402 may receive, over the channel 406, the transmitted data and perform a channel estimation. The UE 402 may provide the received data to a receiver (Rx) that generates decoded information bits from the received data. As shown, the result of the channel estimation performed by the UE 402 may be provided back to the base station 404 for partitioning, as described above.

Aspects herein for ML based dynamic bit loading and channel coding rate control provide for NN-based constellation selection per RE, RB, PRG, and/or the like based on current channel conditions, where both the UE and the base station (e.g., a gNB) implicitly know the selection based on the channel knowledge (e.g., by communicating NN model coefficients therebetween). In this context, FIGS. 5-8 are described below.

Figure 5:
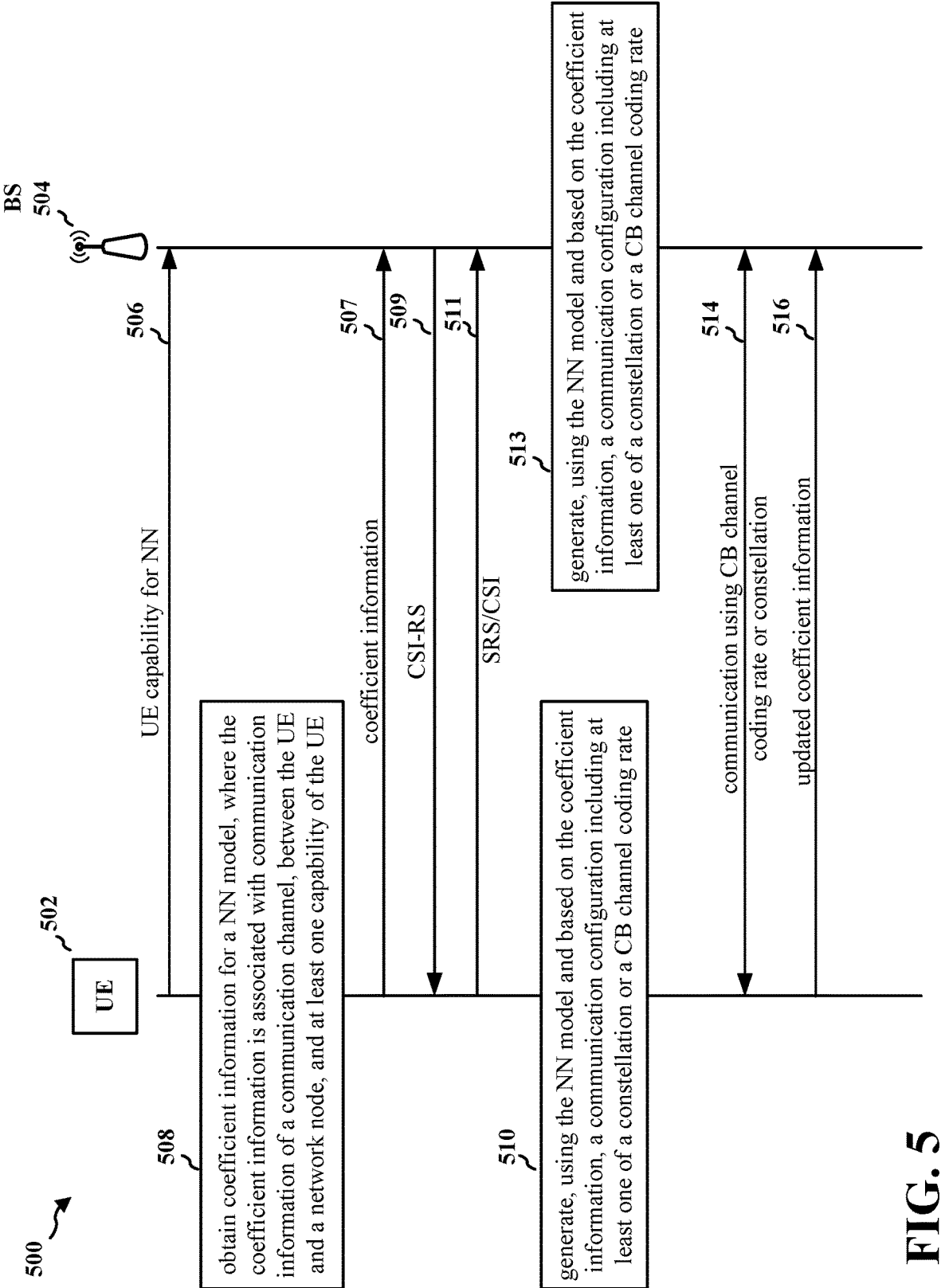
FIG. 5 is a call flow diagram for wireless communications, in accordance with various aspects of the present disclosure.

In the illustrated aspects, a UE and a base station may include respective instances of the same NN model. FIG. 5 is a call flow diagram 500 for wireless communications, in various aspects. Call flow diagram 500 illustrates ML based dynamic bit loading and channel coding rate control by a UE (e.g., a UE 502) that may communicate with a network node (e.g., a base station 504, such as a gNB or other type of base station, by way of example, as shown). Aspects described for the base station 504 may be performed by the base station in aggregated form and/or by one or more components of the base station 504 in disaggregated form. Additionally, or alternatively, the aspects may be performed by the UE 502 autonomously, in addition to, and/or in lieu of, operations of the base station 504, or vice versa. Although aspects are described for a UE and a base station as one example of a receiver and a transmitter, the aspects may be applied for other transmitters and other receivers.

Figure 6:
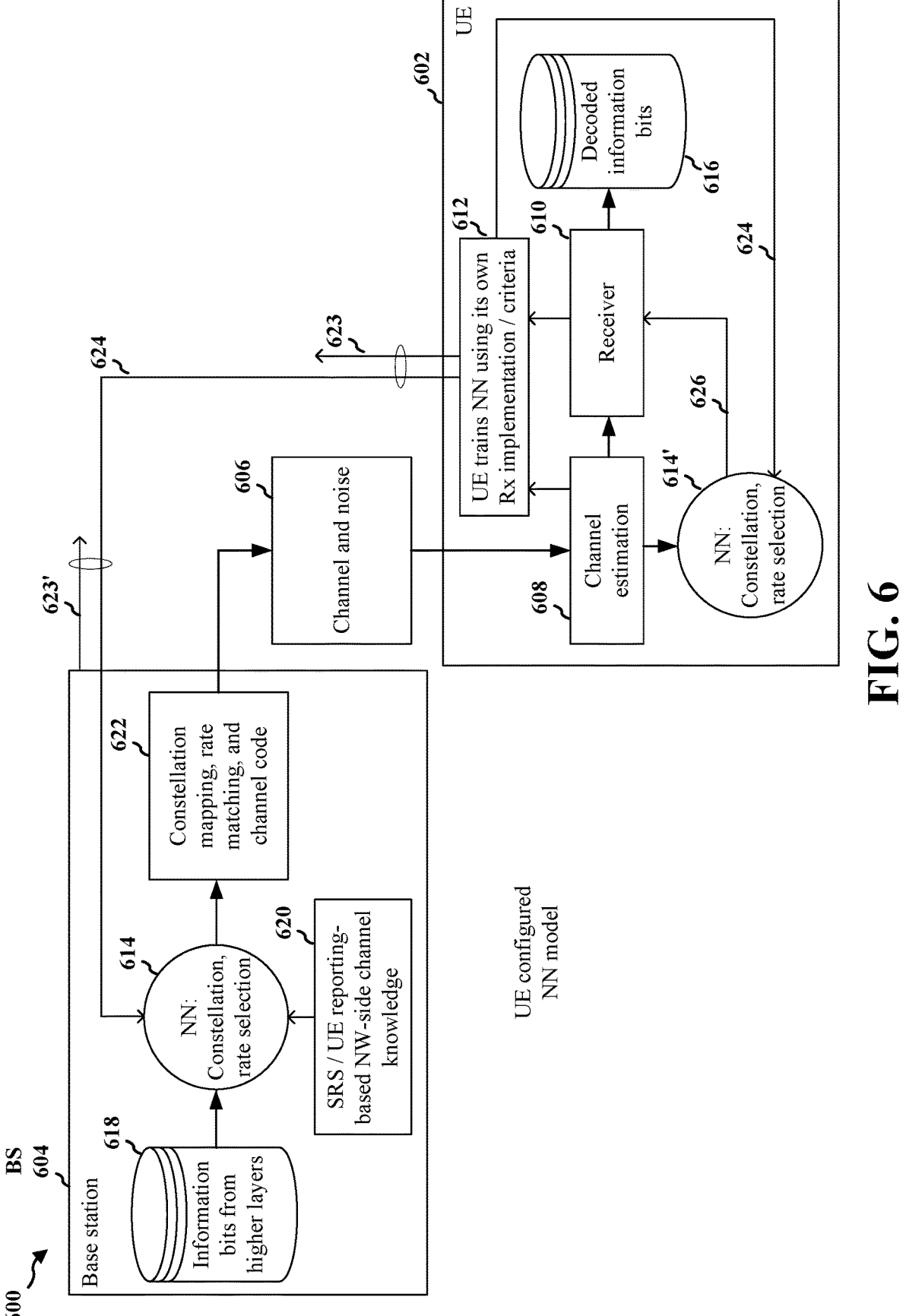
FIG. 6 is a diagram illustrating an example of machine learning (ML) based bit loading and channel coding rate control, in accordance with various aspects of the present disclosure.

FIG. 6 is a diagram 600 illustrating an example of ML based bit loading and channel coding rate control, in various aspects. Diagram 600 shows a UE 602 and a base station 604 that may communicate (e.g., DL as illustrated by way of example, but not limitation) using a communication channel 606 that may introduce noise into communications. The UE 602 may be configured to train or select a preconfigured NN model to generate/obtain constellations for each layer of multiple layers, for each RE of multiple REs, for each RB of multiple RBs, and/or for each PRG of multiple PRGs, and individual CB channel coding rates for each of the CBs of a given TB. This ML based bit loading and channel coding rate control may obviate and/or improve upon prior partitioning that is based on CSF reports of the UE and/or UE transmissions of SRS.

In the illustrated aspect for call flow diagram 500 of FIG. 5, the UE 502 may be configured to provide an indication of at least one capability of the UE 502 (e.g., a UE capability 506) to the base station 504. The UE capability 506 may indicate support/capabilities of the UE 502 associated with an optimization or a restriction for execution of a NN model.

The UE 502 may be configured to obtain (at 508) coefficient information 507 for a NN model, where the coefficient information is associated with communication information of a communication channel, between the UE 502 and the base station 504, and at least one capability of the UE 502 (e.g., the UE capability 506). In aspects, the UE 502 may be configured to obtain (at 508) the coefficient information 507 for the NN model by generating or selecting the coefficient information 507 for the NN model based on a ML training associated with communication information of the communication channel and the at least one capability of the UE 502 (e.g., the UE capability 506), e.g., as described in connection with FIG. 15.

For example, and referring to diagram 600 of FIG. 6, an ML trainer 612 may enable the UE 602 to train a NN model 614' based on communication information of the communication channel 606, as well as its own receiver implementation (e.g., a receiver 610) and/or criteria associated with the capabilities of the UE 602 (such as the UE capability 506, noted above). The UE 602 may also be configured, as similarly described for the UE 502, to provide/transmit these capabilities of the UE 602 to the base station 604, which may have its own respective instance of the NN model, e.g., a NN model 614. As shown in diagram 600, the UE 602 may provide, as inputs for the ML trainer 612, information/data associated with a channel estimation 608 and with the receiver 610. The channel estimation 608 may include channel estimation information of an estimated channel (e.g., pre- or post-whitening) associated with a reference signal or a noise indication (e.g., a noise level or a noise covariance matrix) for the communication channel 606. The ML trainer 612 may be configured to provide as its output(s) coefficient information 624, which may be utilized by the UE 602 for the NN model 614' and by the base station 604 for the NN model 614. The ML trainer 612 may thus generate the NN model 614' using the coefficient information 624. Channel information may include measurements of CSI-RS 509 or SRS 511, for example. For example, the UE 502 may obtain channel information by measuring a signal such as a reference signal (e.g., shown as CSI-RS 509 in FIG. 5). The UE may use the channel information as input in a ML model to obtain output and/or may report CSI to the network at 511. In some aspects, the UE may transmit SRS at 511, and the network may measure the SRS to obtain the channel information.

In call flow diagram 500, the UE 502 may be configured to generate (at 510), using the NN model and based on the coefficient information (with the NN model using the identified coefficients) and the channel information as input, a communication configuration including at least one of a constellation or a CB channel coding rate. For example, the UE may use the model to determine a constellation or CB channel coding rate for particular channel information (e.g., that is provided as input to the model to obtain the output). That is, the UE 502 may be configured to generate/obtain, from the NN model as outputs, at least one of the constellation or the CB channel coding rate for the communication configuration. In aspects, the UE 502 may thus obtain constellations for each layer of multiple layers (e.g., per layer), for each RE of multiple REs (e.g., per RE), for each RB of multiple RBs (e.g., per RB), and/or for each PRG of multiple PRGs (e.g., per PRG), and may obtain individual CB channel coding rates for each of the CBs (e.g., per CB) of a given TB.

FIG. 5 also illustrates that the base station 504 similarly uses a model to generate the constellation/coding rate based on the channel information, at 513. The UE provides the base station with the coefficient information at 507, for example. This enables the UE and the base station to exchange communication using the identified constellations/coding rates for various channel conditions without added overhead to signal the different constellations and coding rates.

Referring again to diagram 600, the NN model 614' of the UE 602 may be configured to generate a communication configuration 626. The communication configuration 626 may be applied to the receiver 610 to communicate, with the base station 604 and based on the CB of a TB using the CB channel coding rate or the constellation generated using the NN model 614'.

In call flow diagram 500, the UE 502 may be configured to transmit, for the base station 504, the coefficient information 507 (e.g., 507 and/or 516) associated with the NN model subsequent to obtaining the coefficient information 507 at 508 for the NN model. The UE 502 may be configured to transmit the coefficient information 507 to the base station 504 using RRC signaling. In aspects, the UE 502 may be configured to transmit, for the base station 504, an initial set of coefficient options (e.g., 'N' sets of coefficient options) for the coefficient information 507 associated with the NN model. The initial set of coefficient options may include at least one option for the coefficient information 507. Each coefficient option of the initial set of coefficient options may correspond to a respective index of a trained, pre-trained, defined, or pre-defined coefficient option specification, list, database, and/or the like (e.g., stored in a data structure of at least one memory of the UE 502), in various aspects. The UE 502 may be configured to transmit the initial set of coefficient options for the coefficient information, e.g., at 507,507 to the base station 504 using RRC signaling. The base station 504 may be configured to select or down-select from the initial set of coefficient options, and to provide/transmit, to be received by the UE 502, at least a portion of the initial set of coefficient options for the coefficient information associated with the NN model, based on the selection/down-selection. For instance, the portion of the initial set of coefficient options for the coefficient information associated with the NN model may include a subset of the initial set of coefficient options that is down-selected from the initial set of coefficient options by the base station 504. In aspects, at least the portion of the initial set of coefficient options for the coefficient information associated with the NN model is received by the UE 502 using at least one of a medium access control (MAC) control element (MAC-CE) or DCI. The UE 502 may be configured to select the coefficient information 507 from the portion of the initial set of coefficient options received for the coefficient information 507.

In furtherance of the above in the context of diagram 600, the ML trainer 612 may be configured to provide as its output(s) coefficient information 624 associated with the NN model 614', which may be utilized by the base station 604 for the NN model 614. The UE 602 may be configured to provide the coefficient information 624 to the base station 604. As similarly noted for call flow diagram 500, in diagram 600, the UE 602 may be configured to transmit/provide, for the base station 604, an initial set of coefficient options 623 (e.g., 'N' sets of coefficient options) for the coefficient information 624 associated with the NN model 614'. The initial set of coefficient options 623 may include at least one option for the coefficient information 624. Each coefficient option of the initial set of coefficient options 623 may correspond to a respective index of a trained, pretrained, defined, or pre-defined coefficient option specification, list, database, and/or the like (e.g., stored in a data structure of at least one memory of the UE 602), in various aspects. The base station 604 may be configured to select or down-select from the initial set of coefficient options 623, and to provide/transmit, to be received by the UE 602, at least a portion 623' of the initial set of coefficient options 623 for the coefficient information 624 based on the selection/down-selection. For instance, the portion 623' of the initial set of coefficient options 623 for the coefficient information 624 associated with the NN model 614' may include a subset of the initial set of coefficient options that is down-selected from the initial set of coefficient options 623 by the base station 604. The UE 602 may be configured to select the coefficient information 624 from the portion 623' of the initial set of coefficient options 623 received for the coefficient information 624.

The UE 502 and the base station 504 in call flow diagram 500 may be configured to communicate (e.g., a communication 514 such as transmissions and/or receptions of data), with each other, e.g., based on the CB of a TB, using the CB channel coding rate or the constellation generated using the NN model.

The UE 502/the base station 504 may be configured, during the communication 514 (e.g., transmission/reception) to transmit/receive an additional CB of the TB for each other. The additional CB may include at least one of a different CB channel coding rate or a different coding rate generated using the NN model, and/or may include at least one of an additional layer, an additional RE, an additional RB, or an additional PRG, of the additional CB having a different constellation generated using the NN model.

Referring back again to diagram 600, the base station 604 may take information bits 618 from higher layers and utilize the NN model 614 to generate such bits for the channel 606 to TBs and CBs thereof. That is, the NN model 614 may use as inputs network-side channel knowledge 620 (e.g., a CSF or SRS from the UE 602 for the channel 606) and the information bits 618 to (i) determine the constellation for a given CB of a TB by which the information bits 618 are to be transmitted via the channel 606, and (ii) determine the CB channel coding rate (per RE, RB, PRG), based at least on the channel knowledge 620. The base station 604 may then perform processing 622 (e.g., constellation mapping, rate matching, and channel coding) for the TBs/CBs, and may transmit the processed TBs/CBs over the channel 606 that may introduce noise into the communication. The UE 602 may then receive, over the channel 606, the transmitted data and perform a channel estimation 608 that is provided to the NN model 614'. Because the UE 602 and the base station 604 both have channel knowledge of the channel 606, the inputs to the NN model 614 and the NN model 614' may be the same or approximately the same (e.g., within a tolerance or threshold by which consistent NN model outputs may be obtained). The UE 602 may provide the received data to the receiver 610 that generates decoded information bits 616 from the received data based on the NN model 614' (e.g., using a communication configuration, as described herein).

Likewise, the UE 602 may be configured to transmit a CB of a TB to the base station 604. The CB of the TB may be transmitted based on the communication configuration 626 associated with the NN model 614' in association with the other instance of the NN model for the base station 604 (e.g., the NN model 614).

Referring finally back to call flow diagram 500, the UE 502 may be configured to transmit, for the base station 504, updated coefficient information 516 for the NN model. In aspects, the updated coefficient information 516 may be transmitted using RRC signaling. The UE 502 may be configured to provide/transmit the updated coefficient information 516 to the base station 504 based on changes in channel conditions and/or the like, according to aspects.

For example, and referring finally back also to diagram 600, the UE 602 may, e.g., by subsequent performance of the channel estimation 608, be configured to determine a change in the condition of the channel 606. The UE 602 may be configured to input the subsequent estimate into the NN model 614', which may cause an update for the communication configuration 626 to the receiver 610, and a corresponding update/retraining for the coefficient information 624 by the ML trainer 612 which may propagate back to the NN model 614' and the NN model 614.

Figure 7:
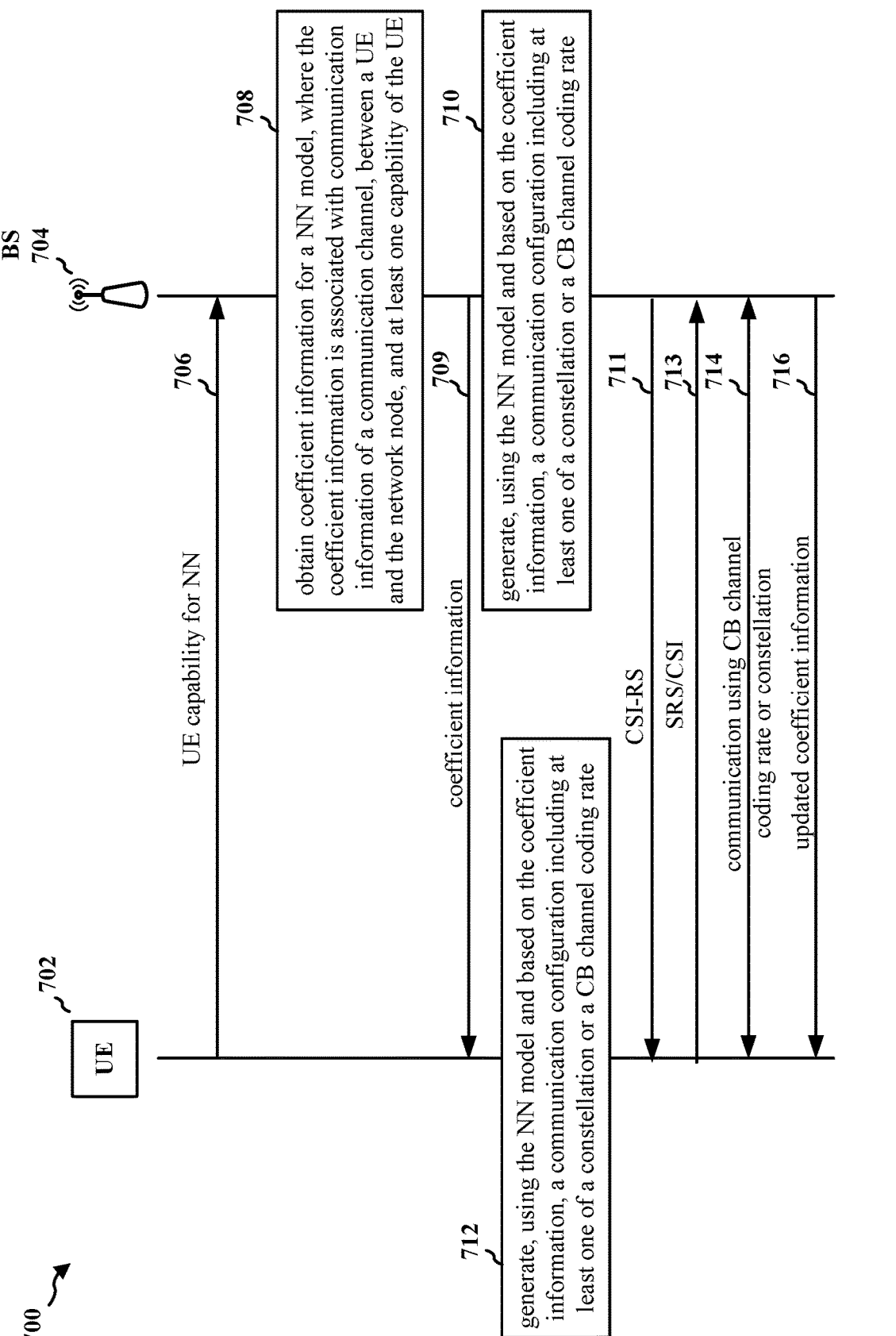
FIG. 7 is a call flow diagram for wireless communications, in accordance with various aspects of the present disclosure.
Figure 8:
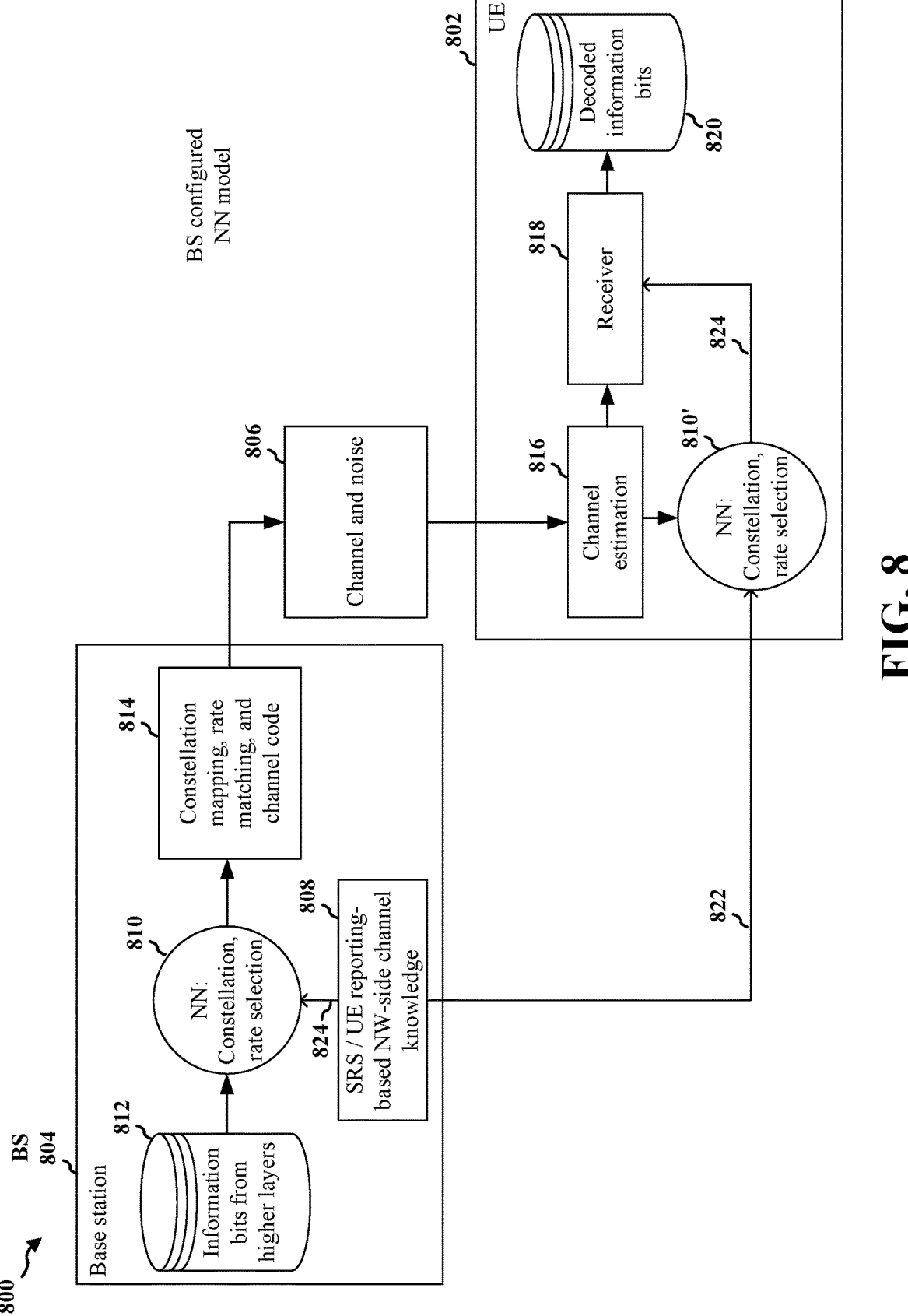
FIG. 8 is a diagram illustrating an example of ML based bit loading and channel coding rate control, in accordance with various aspects of the present disclosure.

FIGS. 7 and 8 are now described. In the illustrated aspects, a UE and a base station may include respective instances of the same NN model. FIG. 7 is a call flow diagram 700 for wireless communications, in various aspects. Call flow diagram 700 illustrates ML based dynamic bit loading and channel coding rate control by a UE (e.g., a UE 702) that may communicate with a network node (e.g., a base station 704, such as a gNB or other type of base station, by way of example, as shown). Aspects described for the base station 704 may be performed by the base station in aggregated form and/or by one or more components of the base station 704 in disaggregated form. Additionally, or alternatively, the aspects may be performed by the UE 702 autonomously, in addition to, and/or in lieu of, operations of the base station 704, or vice versa. As with FIG. 5, a UE and a base station are merely one example of a transmitter and receiver than can employ the aspects described in connection with FIG. 7 and FIG. 8.

FIG. 8 is a diagram 800 illustrating an example of ML based bit loading and channel coding rate control, in various aspects. Diagram 800 shows a UE 802 and a base station 804 that may communicate (e.g., DL as illustrated by way of example, but not limitation) using a communication channel 806 that may introduce noise into communications. The base station 804 may be configured to train or select a preconfigured NN model to generate/obtain constellations for each layer of multiple layers, for each RE of multiple REs, for each RB of multiple RBs, and/or for each PRG of multiple PRGs, and individual CB channel coding rates for each of the CBs of a given TB. This ML based bit loading and channel coding rate control may obviate and improve upon prior partitioning that is based on CSF reports of the UE and/or UE transmissions of SRS.

In the illustrated aspect for call flow diagram 700 of FIG. 7, the UE 702 may be configured to provide an indication of at least one capability of the UE (e.g., a UE capability 706) to the base station 704. The UE capability 706 may indicate support/capabilities of the UE 702 associated with an optimization or a restriction for execution of a NN model.

The base station 704 may be configured to obtain (at 708) coefficient information 709 for a NN model, where the coefficient information 709 is associated with communication information of a communication channel, between the UE 702 and the base station 704, and at least one capability of the UE (e.g., the UE capability 706). In aspects, the UE 702 may be configured to obtain (at 708) the coefficient information for the NN model by generating or selecting the coefficient information 709 for the NN model based on a ML training associated with communication information of the communication channel and the at least one capability of the UE 702 (e.g., the UE capability 706).

For example, and referring to diagram 800 of FIG. 8, an ML trainer or the like may enable the base station 804 to train a NN model 810 based on communication information of the communication channel 806, as well as its own receiver implementation and/or criteria associated with the capabilities of the UE 802 (such as the UE capability 706, noted above). The UE 802 may also be configured, as similarly described for the UE 702, to provide/transmit these capabilities of the UE 802 to the base station 804. In aspects, the UE 802 may have its own respective instance of the NN model 810, e.g., a NN model 810'. In some aspects, the base station 804 may provide, as inputs for an ML trainer, information/data associated with channel knowledge 808 and with the receiver of the base station 804. The channel knowledge 808 may include SRS/UE reporting-based network-side channel knowledge, e.g., for the communication channel 806, and may be used to generate, select, obtain, etc., the coefficient information 822. The base station 804 may be configured to provide coefficient information 822, which may be utilized by the UE 802 for the NN model 810' and by the base station 804 for the NN model 810. The base station 804 may thus generate the NN model 810 using the coefficient information 822, the channel knowledge 808, receiver implementation, and/or criteria associated with the capabilities of the UE 802.

In call flow diagram 700, the base station 704 may be configured to generate (at 710), using the NN model with the coefficient information and channel information as an input to the model, a communication configuration including at least one of a constellation or a CB channel coding rate. That is, the base station 704 may be configured to generate/obtain, from the NN model as outputs, at least one of the constellation or the CB channel coding rate for the communication configuration. In aspects, the base station 704 may thus obtain constellations for each layer of multiple layers, for each RE of multiple REs, for each RB of multiple RBs, and/or for each PRG of multiple PRGs, and may obtain individual CB channel coding rates for each of the CBs of a given TB.

Channel information may include CSI (e.g., based on CSI-RS 711) or SRS 713, for example. For example, the UE 702 may obtain channel information by measuring a signal such as a reference signal (e.g., shown as CSI-RS 711 in FIG. 7). The UE may use the channel information as input in a ML model to obtain output and/or may report CSI to the network at 713. In some aspects, the UE may transmit SRS at 713, and the network may measure the SRS to obtain the channel information.

As shown at 712, the UE 702 may use the received coefficients to apply in the NN model, and may input the channel conditions into the model to determine constellation(s) and/or coding rates for communication with the network. The exchange of the coefficients enables the UE and the base station to identify the constellations and coding rate for various channel information without added overhead to signal the constellation and coding rate.

Referring again to diagram 800, the NN model 810 of the base station 704 may be configured to generate a communication configuration 824. The communication configuration 824 may be applied to a receiver/transmitter of the base station 704 to communicate, with the UE 802 and based on the CB of a TB using the CB channel coding rate or the constellation generated using the NN model 810.

In call flow diagram 700, the base station 704 may be configured to transmit, for the UE 702, the coefficient information 709 associated with the NN model subsequent to obtaining the coefficient information 709 for the NN model. The base station 704 may be configured to transmit the coefficient information 709 to the UE 702 using RRC signaling.

In furtherance of the above in the context of diagram 800, the ML trainer 612 may be configured to provide as its output(s) coefficient information 822 associated with the NN model 810, which may be utilized by the UE 802 for the NN model 810'. The base station 804 may be configured to provide the coefficient information 822 to the UE 802.

The UE 702 and the base station 704 in call flow diagram 700 may be configured to communicate (e.g., a communication 714 such as transmissions and/or receptions of data), with each other, e.g., based on the CB of a TB, using the CB channel coding rate or the constellation generated using the NN model.

The UE 702/the base station 704 may be configured, during the communication 714 (e.g., transmission/reception) to transmit/receive an additional CB of the TB for each other. The additional CB may include at least one of a different CB channel coding rate or a different coding rate generated using the NN model, and/or may include at least one of an additional layer, an additional RE, an additional RB, or an additional PRG, of the additional CB having a different constellation generated using the NN model.

Referring back again to diagram 800, the base station 804 may take information bits 812 from higher layers and utilize the NN model 810 to generate such bits for the channel 806 to TBs and CBs thereof. That is, the NN model 810 may use as inputs network-side channel knowledge 808 and the information bits 812 to (i) determine the constellation for a given CB of a TB by which the information bits 812 are to be transmitted via the channel 806, and (ii) determine the CB channel coding rate (per RE. RB, PRG), based at least on the channel knowledge 808. The base station 804 may then perform processing 814 (e.g., constellation mapping, rate matching, and channel coding) for the TBs/CBs, and may transmit the processed TBs/CBs over the channel 806 that may introduce noise into the communication. The UE 802 may then receive, over the channel 806, the transmitted data and perform a channel estimation 816 that is provided to the NN model 810'. Because the UE 802 and the base station 804 both have channel knowledge of the channel 806, the inputs to the NN model 810 and the NN model 810' may be the same or approximately the same (e.g., within a tolerance or threshold by which consistent NN model outputs may be obtained). The UE 802 may provide the received data to a receiver 818 that generates decoded information bits 820 from the received data based on the NN model 810' (e.g., using the communication configuration 824, as described herein).

Likewise, the UE 802 may be configured to transmit a CB of a TB to the base station 804. The CB of the TB may be transmitted based on the communication configuration 824 associated with the NN model 810' in association with the other instance of the NN model for the base station 804 (e.g., the NN model 810).

Referring finally back to call flow diagram 700, the base station 704 may be configured to transmit, for the UE 702, updated coefficient information 716 for the NN model. In aspects, the updated coefficient information 716 may be transmitted using RRC signaling. The base station 704 may be configured to provide/transmit the updated coefficient information 716 to the UE 702 based on changes in channel conditions and/or the like, according to aspects.

For example, and referring finally back also to diagram 800, the base station 804 may, e.g., by subsequent acquisition of network-side channel knowledge 808, be configured to determine a change in the condition of the communication channel 806. The base station 804 may be configured to input the subsequent knowledge into the NN model 810', which may cause an update of the communication configurations for the base station 804, and a corresponding update/retraining for the coefficient information 822 which may propagate back to the NN model 810' and the NN model 810.

FIG. 9 is a flowchart 900 of a method of wireless communication, in various aspects. The method may be performed by a UE (e.g., the UE 104, 502, 602, 702, 802; the apparatus 1304). In some aspects, the method may include aspects described in connection with the communication flow in FIG. 5 and/or aspects described in FIGS. 6-8. The method provides for ML based dynamic bit loading and channel coding rate control that enables using deep-learning based selections of bit loading and dynamic channel code rates to increase spectral efficiency and granularity of CB channel coding rate per CB, as well as of constellations for each layer of multiple layers, for each RE of multiple REs, for each RB of multiple RBs, and/or for each PRG of multiple PRGs, that enables adapting NN-based implementations and training for bit loading and channel coding rate control to optimize receiver performance based on channel conditions while minimizing the signaling impact and latency of such signaling, and that enables communicating NN coefficients between a transmitter and a receiver for cross-training of the network side, as well as for reductions of the signaling overhead and latency.

At 902, a UE obtains coefficient information for a NN model, where the coefficient information is associated with communication information of a communication channel, between the UE and a network node, and at least one capability of the UE. As an example, the obtainment may be performed, at least in part, by the component 198. FIGS. 5, 6 illustrate an example of the UE 502 obtaining such coefficient information. The information may be obtained using any of the aspects described in connection with FIG. 15, for example.

The UE 502 may be configured to provide an indication of at least one capability of the UE 502 (e.g., a UE capability 506) to the base station 504. The UE capability 506 may indicate support/capabilities of the UE 502 associated with an optimization or a restriction for execution of a NN model. The UE 502 may be configured to obtain (at 508) coefficient information 507 for a NN model, where the coefficient information is associated with communication information of a communication channel, between the UE 502 and the base station 504, and at least one capability of the UE 502 (e.g., the UE capability 506). In aspects, the UE 502 may be configured to obtain (at 508) the coefficient information 507 for the NN model by generating or selecting the coefficient information 507 for the NN model based on a ML training associated with communication information of the communication channel and the at least one capability of the UE 502 (e.g., the UE capability 506). Referring to diagram 600 of FIG. 6, an ML trainer 612 may enable the UE 602 to train a NN model 614' based on communication information of the communication channel 606, as well as its own receiver implementation (e.g., a receiver 610) and/or criteria associated with the capabilities of the UE 602 (such as the UE capability 506, noted above). The UE 602 may also be configured, as similarly described for the UE 502, to provide/transmit these capabilities of the UE 602 to the base station 604, which may have its own respective instance of the NN model, e.g., a NN model 614. As shown in diagram 600, the UE 602 may provide, as inputs for the ML trainer 612, information/data associated with a channel estimation 608 and with the receiver 610. The channel estimation 608 may include channel estimation information of an estimated channel (e.g., pre- or post-whitening) associated with a reference signal or a noise indication (e.g., a noise level or a noise covariance matrix) for the communication channel 606. The ML trainer 612 may be configured to provide as its output(s) coefficient information 624, which may be utilized by the UE 602 for the NN model 614' and by the base station 604 for the NN model 614. The ML trainer 612 may thus generate the NN model 614' using the coefficient information 624.

At 904, the UE generates, using the NN model and based on the coefficient information, a communication configuration including at least one of a constellation or a CB channel coding rate. As an example, the generation may be performed, at least in part, by the component 198. FIGS. 5, 6 illustrate an example of the UE 502 generating such a communication configuration.

The UE 502 may be configured to generate (at 510), using the NN model and based on the coefficient information, a communication configuration including at least one of a constellation or a CB channel coding rate. That is, the UE 502 may be configured to generate/obtain, from the NN model as outputs, at least one of the constellation or the CB channel coding rate for the communication configuration. In aspects, the UE 502 may thus obtain constellations for each layer of multiple layers, for each RE of multiple REs, for each RB of multiple RBs, and/or for each PRG of multiple PRGs, and may obtain individual CB channel coding rates for each of the CBs of a given TB. Referring to diagram 600, the NN model 614' of the UE 602 may be configured to generate a communication configuration 626. The communication configuration 626 may be applied to the receiver 610 to communicate, with the base station 604 and based on the CB of a TB using the CB channel coding rate or the constellation generated using the NN model 614'. FIG. 15 illustrates example aspects of model inference.

At 906, the UE communicates, with the network node and based on the CB of a TB, using the CB channel coding rate or the constellation generated using the NN model. As an example, the communication may be performed, at least in part, by the component 198. FIGS. 5, 6 illustrate an example of the UE 502 communicating with a network node (e.g., the base station 504).

The UE 502 may be configured to transmit, for the base station 504, the coefficient information 507 associated with the NN model subsequent to obtaining the coefficient information 507 for the NN model. The UE 502 may be configured to transmit the coefficient information 507 to the base station 504 using RRC signaling. In aspects, the UE 502 may be configured to transmit, for the base station 504, an initial set of coefficient options (e.g., 'N' sets of coefficient options) for the coefficient information 507 associated with the NN model. The initial set of coefficient options may include at least one option for the coefficient information 507. Each coefficient option of the initial set of coefficient options may correspond to a respective index of a trained, pre-trained, defined, or pre-defined coefficient option specification, list, database, and/or the like (e.g., stored in a data structure of at least one memory of the UE 502), in various aspects. The UE 502 may be configured to transmit the initial set of coefficient options for the coefficient information 507 to the base station 504 using RRC signaling. The base station 504 may be configured to select or down-select from the initial set of coefficient options, and to provide/transmit, to be received by the UE 502, at least a portion of the initial set of coefficient options for the coefficient information associated with the NN model, based on the selection/down-selection. For instance, the portion of the initial set of coefficient options for the coefficient information associated with the NN model may include a subset of the initial set of coefficient options that is down-selected from the initial set of coefficient options by the base station 504. In aspects, at least the portion of the initial set of coefficient options for the coefficient information associated with the NN model is received by the UE 502 using at least one of a medium access control (MAC) control element (MAC-CE) or DCI. The UE 502 may be configured to select the coefficient information 507 from the portion of the initial set of coefficient options received for the coefficient information 507. In in the context of diagram 600, the ML trainer 612 may be configured to provide as its output(s) coefficient information 624 associated with the NN model 614', which may be utilized by the base station 604 for the NN model 614. The UE 602 may be configured to provide the coefficient information 624 to the base station 604. As similarly noted for call flow diagram 500, in diagram 600, the UE 602 may be configured to transmit/provide, for the base station 604, an initial set of coefficient options 623 (e.g., 'N' sets of coefficient options) for the coefficient information 624 associated with the NN model 614'. The initial set of coefficient options 623 may include at least one option for the coefficient information 624. Each coefficient option of the initial set of coefficient options 623 may correspond to a respective index of a trained, pre-trained, defined, or pre-defined coefficient option specification, list, database, and/or the like (e.g., stored in a data structure of at least one memory of the UE 602), in various aspects. The base station 604 may be configured to select or down-select from the initial set of coefficient options 623, and to provide/transmit, to be received by the UE 602, at least a portion 623' of the initial set of coefficient options 623 for the coefficient information 624 based on the selection/down-selection. For instance, the portion 623' of the initial set of coefficient options 623 for the coefficient information 624 associated with the NN model 614' may include a subset of the initial set of coefficient options that is down-selected from the initial set of coefficient options 623 by the base station 604. The UE 602 may be configured to select the coefficient information 624 from the portion 623' of the initial set of coefficient options 623 received for the coefficient information 624.

The UE 502 and the base station 504 in call flow diagram 500 may be configured to communicate (e.g., a communication 514 such as transmissions and/or receptions of data), with each other, e.g., based on the CB of a TB, using the CB channel coding rate or the constellation generated using the NN model. The UE 502/the base station 504 may be configured, during the communication 514 (e.g., transmission/reception) to transmit/receive an additional CB of the TB for each other. The additional CB may include at least one of a different CB channel coding rate or a different coding rate generated using the NN model, and/or may include at least one of an additional layer, an additional RE, an additional RB, or an additional PRG, of the additional CB having a different constellation generated using the NN model.

Referring to diagram 600, the base station 604 may take information bits 618 from higher layers and utilize the NN model 614 to generate such bits for the channel 606 to TBs and CBs thereof. That is, the NN model 614 may use as inputs network-side channel knowledge 620 (e.g., a CSF or SRS from the UE 602 for the channel 606) and the information bits 618 to (i) determine the constellation for a given CB of a TB by which the information bits 618 are to be transmitted via the channel 606, and (ii) determine the CB channel coding rate (per RE, RB, PRG), based at least on the channel knowledge 620. The base station 604 may then perform processing 622 (e.g., constellation mapping, rate matching, and channel coding) for the TBs/CBs, and may transmit the processed TBs/CBs over the channel 606 that may introduce noise into the communication. The UE 602 may then receive, over the channel 606, the transmitted data and perform a channel estimation 608 that is provided to the NN model 614'. Because the UE 602 and the base station 604 both have channel knowledge of the channel 606, the inputs to the NN model 614 and the NN model 614' may be the same or approximately the same (e.g., within a tolerance or threshold by which consistent NN model outputs may be obtained). The UE 602 may provide the received data to the receiver 610 that generates decoded information bits 616 from the received data based on the NN model 614' (e.g., using a communication configuration, as described herein). Likewise, the UE 602 may be configured to transmit a CB of a TB to the base station 604. The CB of the TB may be transmitted based on the communication configuration 626 associated with the NN model 614' in association with the other instance of the NN model for the base station 604 (e.g., the NN model 614).

Figure 10:
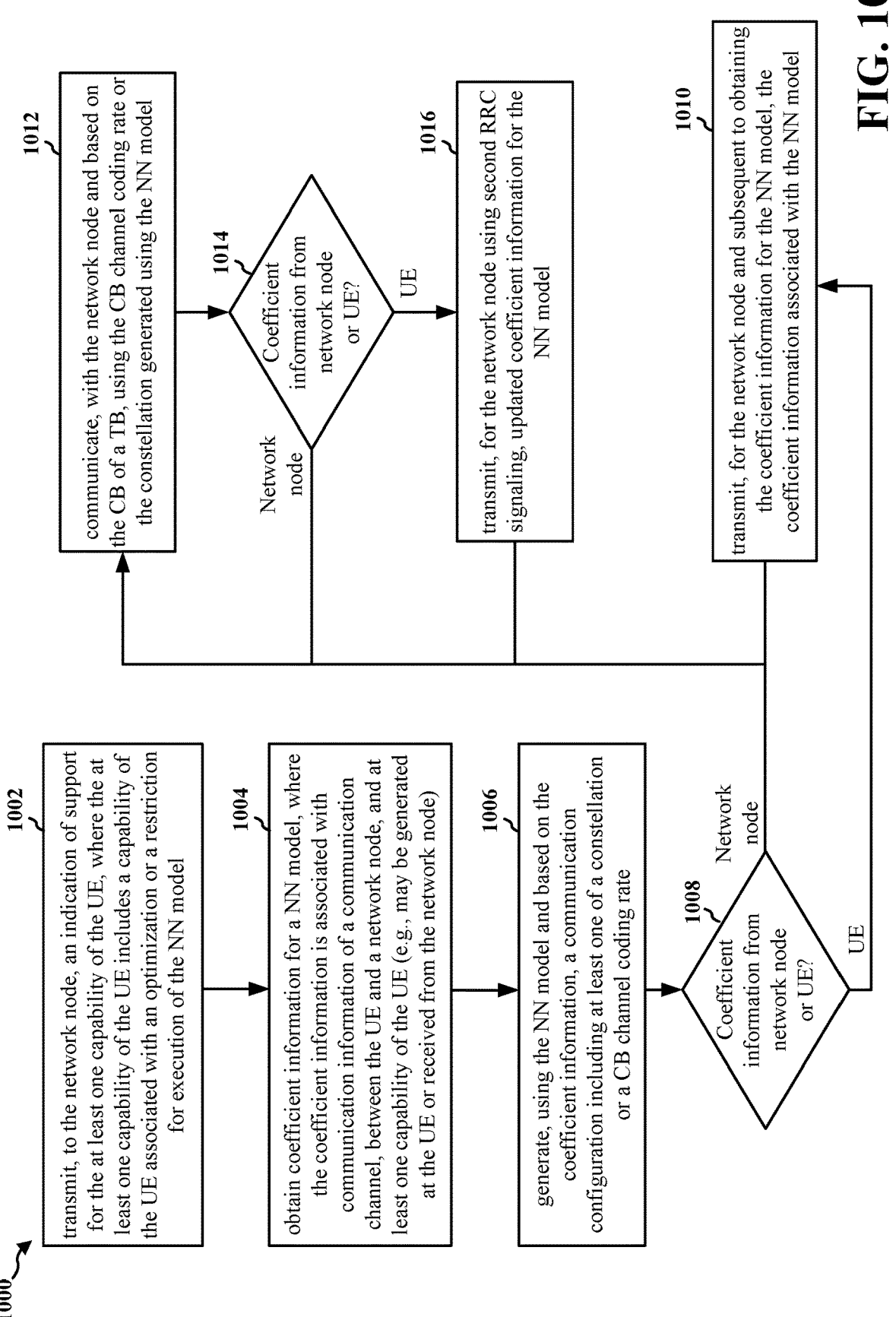
FIG. 10 is a flowchart of a method of wireless communication, in accordance with various aspects of the present disclosure.

FIG. 10 is a flowchart 1000 of a method of wireless communication, in various aspects. The method may be performed by a UE (e.g., the UE 104, 502, 602, 702, 802; the apparatus 1304). In some aspects, the method may include aspects described in connection with the communication flow in FIG. 5 and/or aspects described in FIGS. 6-8. The method provides for ML based dynamic bit loading and channel coding rate control that enables using deep-learning based selections of bit loading and dynamic channel code rates to increase spectral efficiency and granularity of CB channel coding rate per CB, as well as of constellations for each layer of multiple layers, for each RE of multiple REs, for each RB of multiple RBs, and/or for each PRG of multiple PRGs, that enables adapting NN-based implementations and training for bit loading and channel coding rate control to optimize receiver performance based on channel conditions while minimizing the signaling impact and latency of such signaling, and that enables communicating NN coefficients between a transmitter and a receiver for cross-training of the network side, as well as for reductions of the signaling overhead and latency.

At 1002, the UE transmits, to the network node, an indication of support for the at least one capability of the UE, where the at least one capability of the UE includes a capability of the UE associated with an optimization or a restriction for execution of the NN model. As an example, the transmission may be performed, at least in part, by the component 198. FIGS. 5, 6 illustrate an example of the UE 502 transmitting such indication of support for a network node (e.g., the base station 504).

The UE 502 may be configured to provide an indication of at least one capability of the UE 502 (e.g., a UE capability 506) to the base station 504. The UE capability 506 may indicate support/capabilities of the UE 502 associated with an optimization or a restriction for execution of a NN model. Similarly, in FIG. 6, the UE 602 may be configured to provide an indication of at least one capability of the UE 602 (e.g., as for the UE capability 506) to the base station 604.

At 1004, UE obtains coefficient information for a NN model, where the coefficient information is associated with communication information of a communication channel, between the UE and a network node, and at least one capability of the UE. As an example, the obtainment may be performed, at least in part, by the component 198. FIGS. 5, 6 illustrate an example of the UE 502 obtaining such coefficient information.

The UE 502 may be configured to obtain (at 508) coefficient information 507 for a NN model, where the coefficient information is associated with communication information of a communication channel, between the UE 502 and the base station 504, and at least one capability of the UE 502 (e.g., the UE capability 506). In aspects, the UE 502 may be configured to obtain (at 508) the coefficient information 507 for the NN model by generating or selecting the coefficient information 507 for the NN model based on a ML training associated with communication information of the communication channel and the at least one capability of the UE 502 (e.g., the UE capability 506). Referring to diagram 600 of FIG. 6, an ML trainer 612 may enable the UE 602 to train a NN model 614' based on communication information of the communication channel 606, as well as its own receiver implementation (e.g., a receiver 610) and/or criteria associated with the capabilities of the UE 602 (such as the UE capability 506, noted above). The UE 602 may also be configured, as similarly described for the UE 502, to provide/transmit these capabilities of the UE 602 to the base station 604, which may have its own respective instance of the NN model, e.g., a NN model 614. As shown in diagram 600, the UE 602 may provide, as inputs for the ML trainer 612, information/data associated with a channel estimation 608 and with the receiver 610. The channel estimation 608 may include channel estimation information of an estimated channel (e.g., pre- or post-whitening) associated with a reference signal or a noise indication (e.g., a noise level or a noise covariance matrix) for the communication channel 606. The ML trainer 612 may be configured to provide as its output(s) coefficient information 624, which may be utilized by the UE 602 for the NN model 614' and by the base station 604 for the NN model 614. The ML trainer 612 may thus generate the NN model 614' using the coefficient information 624. FIG. 15 illustrates example aspects of model training.

At 1006, the UE generates, using the NN model and based on the coefficient information, a communication configuration including at least one of a constellation or a CB channel coding rate. As an example, the generation may be performed, at least in part, by the component 198. FIGS. 5, 6 illustrate an example of the UE 502 generating such a communication configuration. FIG. 15 illustrates example aspects of model inference.

The UE 502 may be configured to generate (at 510), using the NN model and based on the coefficient information, a communication configuration including at least one of a constellation or a CB channel coding rate. That is, the UE 502 may be configured to generate/obtain, from the NN model as outputs, at least one of the constellation or the CB channel coding rate for the communication configuration. In aspects, the UE 502 may thus obtain constellations for each layer of multiple layers, for each RE of multiple REs, for each RB of multiple RBs, and/or for each PRG of multiple PRGs. and may obtain individual CB channel coding rates for each of the CBs of a given TB. Referring to diagram 600, the NN model 614' of the UE 602 may be configured to generate a communication configuration 626. The communication configuration 626 may be applied to the receiver 610 to communicate, with the base station 604 and based on the CB of a TB using the CB channel coding rate or the constellation generated using the NN model 614'.

At 1008, it may be determined (e.g., via configuration) if the coefficient information is obtained from the network node or from the UE. That is, a determination may be made as to whether the network node or the UE configures the NN model. As an example, the determination may be performed, at least in part, by the component 198. If it is the UE, flowchart 1000 continues to 1010. If it is the network node, flowchart 1000 continues to 1012.

At 1010, the UE transmits, for the network node and subsequent to obtaining the coefficient information for the NN model, the coefficient information associated with the NN model. As an example, the transmission may be performed, at least in part, by the component 198. FIGS. 5, 6 illustrate an example of the UE 502 transmitting such coefficient information to a network node (e.g., the base station 504).

The UE 502 may be configured to transmit, for the base station 504, the coefficient information 507 associated with the NN model subsequent to obtaining the coefficient information 507 for the NN model. The UE 502 may be configured to transmit the coefficient information 507 to the base station 504 using RRC signaling. In aspects, the UE 502 may be configured to transmit, for the base station 504, an initial set of coefficient options (e.g., 'N' sets of coefficient options) for the coefficient information 507 associated with the NN model. The initial set of coefficient options may include at least one option for the coefficient information 507. Each coefficient option of the initial set of coefficient options may correspond to a respective index of a trained, pre-trained, defined, or pre-defined coefficient option specification, list, database, and/or the like (e.g., stored in a data structure of at least one memory of the UE 502), in various aspects. The UE 502 may be configured to transmit the initial set of coefficient options for the coefficient information 507 to the base station 504 using RRC signaling. The base station 504 may be configured to select or down-select from the initial set of coefficient options, and to provide/transmit, to be received by the UE 502, at least a portion of the initial set of coefficient options for the coefficient information associated with the NN model, based on the selection/down-selection. For instance, the portion of the initial set of coefficient options for the coefficient information associated with the NN model may include a subset of the initial set of coefficient options that is down-selected from the initial set of coefficient options by the base station 504. In aspects, at least the portion of the initial set of coefficient options for the coefficient information associated with the NN model is received by the UE 502 using at least one of a medium access control (MAC) control element (MAC-CE) or DCI. The UE 502 may be configured to select the coefficient information 507 from the portion of the initial set of coefficient options received for the coefficient information 507. In in the context of diagram 600, the ML trainer 612 may be configured to provide as its output(s) coefficient information 624 associated with the NN model 614', which may be utilized by the base station 604 for the NN model 614. The UE 602 may be configured to provide the coefficient information 624 to the base station 604. As similarly noted for call flow diagram 500, in diagram 600, the UE 602 may be configured to transmit/provide, for the base station 604, an initial set of coefficient options 623 (e.g., 'N' sets of coefficient options) for the coefficient information 624 associated with the NN model 614'. The initial set of coefficient options 623 may include at least one option for the coefficient information 624. Each coefficient option of the initial set of coefficient options 623 may correspond to a respective index of a trained, pre-trained, defined, or pre-defined coefficient option specification, list, database, and/or the like (e.g., stored in a data structure of at least one memory of the UE 602), in various aspects. The base station 604 may be configured to select or down-select from the initial set of coefficient options 623, and to provide/transmit, to be received by the UE 602, at least a portion 623' of the initial set of coefficient options 623 for the coefficient information 624 based on the selection/down-selection. For instance, the portion 623' of the initial set of coefficient options 623 for the coefficient information 624 associated with the NN model 614' may include a subset of the initial set of coefficient options that is down-selected from the initial set of coefficient options 623 by the base station 604. The UE 602 may be configured to select the coefficient information 624 from the portion 623' of the initial set of coefficient options 623 received for the coefficient information 624.

At 1012, the UE communicates, with the network node and based on the CB of a TB, using the CB channel coding rate or the constellation generated using the NN model. As an example, the communication may be performed, at least in part, by the component 198. FIGS. 5, 6 illustrate an example of the UE 502 communicating with a network node (e.g., the base station 504).

The UE 502 and the base station 504 in call flow diagram 500 may be configured to communicate (e.g., a communication 514 such as transmissions and/or receptions of data), with each other, e.g., based on the CB of a TB, using the CB channel coding rate or the constellation generated using the NN model. The UE 502/the base station 504 may be configured, during the communication 514 (e.g., transmission/reception) to transmit/receive an additional CB of the TB for each other. The additional CB may include at least one of a different CB channel coding rate or a different coding rate generated using the NN model, and/or may include at least one of an additional layer, an additional RE, an additional RB, or an additional PRG, of the additional CB having a different constellation generated using the NN model.

Referring to diagram 600, the base station 604 may take information bits 618 from higher layers and utilize the NN model 614 to generate such bits for the channel 606 to TBs and CBs thereof. That is, the NN model 614 may use as inputs network-side channel knowledge 620 (e.g., a CSF or SRS from the UE 602 for the channel 606) and the information bits 618 to (i) determine the constellation for a given CB of a TB by which the information bits 618 are to be transmitted via the channel 606, and (ii) determine the CB channel coding rate (per RE, RB, PRG), based at least on the channel knowledge 620. The base station 604 may then perform processing 622 (e.g., constellation mapping, rate matching, and channel coding) for the TBs/CBs, and may transmit the processed TBs/CBs over the channel 606 that may introduce noise into the communication. The UE 602 may then receive, over the channel 606, the transmitted data and perform a channel estimation 608 that is provided to the NN model 614'. Because the UE 602 and the base station 604 both have channel knowledge of the channel 606, the inputs to the NN model 614 and the NN model 614' may be the same or approximately the same (e.g., within a tolerance or threshold by which consistent NN model outputs may be obtained). The UE 602 may provide the received data to the receiver 610 that generates decoded information bits 616 from the received data based on the NN model 614' (e.g., using a communication configuration, as described herein). Likewise, the UE 602 may be configured to transmit a CB of a TB to the base station 604. The CB of the TB may be transmitted based on the communication configuration 626 associated with the NN model 614' in association with the other instance of the NN model for the base station 604 (e.g., the NN model 614).

At 1014, it may be determined (e.g., via configuration) if the coefficient information is obtained from the network node or from the UE. That is, a determination may be made as to whether the network node or the UE configures the NN model. In aspects, the determination at 1014 may be performed based on changes to channel conditions, e.g., which may lead to adjustments/retraining of coefficient information for updated coefficient information (e.g., by reperforming 1004 and/or 1006). As an example, the determination may be performed, at least in part, by the component 198. If it is the UE, flowchart 1000 continues to 1016. If it is the network node/base station, flowchart 1000 continues back to 1012.

At 1016, the UE transmits, for the network node using second RRC signaling, updated coefficient information for the NN model. As an example, the transmission may be performed, at least in part, by the component 198. FIGS. 5, 6 illustrate an example of the UE 502 transmitting such updated coefficient information for a network node (e.g., the base station 504).

The UE 502 may be configured to transmit, for the base station 504, updated coefficient information 516 for the NN model. In aspects, the updated coefficient information 516 may be transmitted using RRC signaling. The UE 502 may be configured to provide/transmit the updated coefficient information 516 to the base station 504 based on changes in channel conditions and/or the like, according to aspects. Referring to diagram 600, the UE 602 may, e.g., by subsequent performance of the channel estimation 608, be configured to determine a change in the condition of the channel 606. The UE 602 may be configured to input the subsequent estimate into the NN model 614', which may cause an update for the communication configuration 626 to the receiver 610, and a corresponding update/retraining for the coefficient information 624 by the ML trainer 612 which may propagate back to the NN model 614' and the NN model 614.

FIG. 11 is a flowchart 1100 of a method of wireless communication, in various aspects. The method may be performed by a base station (e.g., the base station 102, 504, 604, 704, 804; the network entity 1302, 1402). In some aspects, the method may include aspects described in connection with the communication flow in FIG. 7 and/or aspects described in FIGS. 5, 6, 8. The method provides for ML based dynamic bit loading and channel coding rate control that enables using deep-learning based selections of bit loading and dynamic channel code rates to increase spectral efficiency and granularity of CB channel coding rate per CB, as well as of constellations for each layer of multiple layers, for each RE of multiple REs, for each RB of multiple RBs, and/or for each PRG of multiple PRGs, that enables adapting NN-based implementations and training for bit loading and channel coding rate control to optimize receiver performance based on channel conditions while minimizing the signaling impact and latency of such signaling, and that enables communicating NN coefficients between a transmitter and a receiver for cross-training of the network side, as well as for reductions of the signaling overhead and latency.

At 1102, the base station obtains coefficient information for a NN model, where the coefficient information is associated with communication information of a communication channel, between a UE and the network node, and at least one capability of the UE. As an example, the obtainment may be performed, at least in part, by the component 199. FIGS. 7, 8 illustrate an example of the base station 704 obtaining such coefficient information. FIG. 15 illustrates example aspects of model training.

The UE 702 may be configured to provide an indication of at least one capability of the UE (e.g., a UE capability 706) to the base station 704. The UE capability 706 may indicate support/capabilities of the UE 702 associated with an optimization or a restriction for execution of a NN model. The base station 704 may be configured to obtain (at 708) coefficient information 709 for a NN model, where the coefficient information 709 is associated with communication information of a communication channel, between the UE 702 and the base station 704, and at least one capability of the UE (e.g., the UE capability 706). In aspects, the UE 702 may be configured to obtain (at 708) the coefficient information for the NN model by generating or selecting the coefficient information 709 for the NN model based on a ML training associated with communication information of the communication channel and the at least one capability of the UE 702 (e.g., the UE capability 706). The model may be trained, e.g., using any of the aspects described in connection with FIG. 15, for example.

In diagram 800 of FIG. 8, an ML trainer or the like may enable the base station 804 to train a NN model 810 based on communication information of the communication channel 806, as well as its own receiver implementation and/or criteria associated with the capabilities of the UE 802 (such as the UE capability 706, noted above). The UE 802 may also be configured, as similarly described for the UE 702, to provide/transmit these capabilities of the UE 802 to the base station 804. In aspects, the UE 802 may have its own respective instance of the NN model 810, e.g., a NN model 810'. In some aspects, the base station 804 may provide, as inputs for an ML trainer, information/data associated with channel knowledge 808 and with the receiver of the base station 804. The channel knowledge 808 may include SRS/ UE reporting-based network-side channel knowledge, e.g., for the communication channel 806, and may be used to generate, select, obtain, etc., the coefficient information 822. The base station 804 may be configured to provide coefficient information 822, which may be utilized by the UE 802 for the NN model 810' and by the base station 804 for the NN model 810. The base station 804 may thus generate the NN model 810 using the coefficient information 822, the channel knowledge 808, receiver implementation, and/or criteria associated with the capabilities of the UE 802.

At 1104, the base station generates, using the NN model and based on the coefficient information, a communication configuration including at least one of a constellation or a CB channel coding rate. As an example, the generation may be performed, at least in part, by the component 199. FIGS. 7, 8 illustrate an example of the base station 704 generating such a communication configuration. FIG. 15 illustrates example aspects of model inference.

, the base station 704 may be configured to generate (at 710), using the NN model and based on the coefficient information, a communication configuration including at least one of a constellation or a CB channel coding rate. That is, the base station 704 may be configured to generate/ obtain, from the NN model as outputs, at least one of the constellation or the CB channel coding rate for the communication configuration. In aspects, the base station 704 may thus obtain constellations for each layer of multiple layers, for each RE of multiple REs, for each RB of multiple RBs, and/or for each PRG of multiple PRGs, and may obtain individual CB channel coding rates for each of the CBs of a given TB.

In diagram 800, the NN model 810 of the base station 704 may be configured to generate a communication configuration 824. The communication configuration 824 may be applied to a receiver/transmitter of the base station 704 to communicate, with the UE 802 and based on the CB of a TB using the CB channel coding rate or the constellation generated using the NN model 810. In furtherance of the above in the context of diagram 800, the ML trainer 612 may be configured to provide as its output(s) coefficient information 822 associated with the NN model 810, which may be utilized by the UE 802 for the NN model 810'. The base station 804 may be configured to provide the coefficient information 822 to the UE 802.

At 1106, the base station communicates, with the UE and based on the CB of a TB, using the channel coding rate or the constellation generated using the NN. As an example, the communication may be performed, at least in part, by the component 199. FIGS. 7, 8 illustrate an example of the base station 704 communicating with a UE (e.g., the UE 702).

The UE 702 and the base station 704 in call flow diagram 700 may be configured to communicate (e.g., a communication 714 such as transmissions and/or receptions of data), with each other, e.g., based on the CB of a TB, using the CB channel coding rate or the constellation generated using the NN model. The UE 702/the base station 704 may be configured, during the communication 714 (e.g., transmission/reception) to transmit/receive an additional CB of the TB for each other. The additional CB may include at least one of a different CB channel coding rate or a different coding rate generated using the NN model, and/or may include at least one of an additional layer, an additional RE, an additional RB, or an additional PRG, of the additional CB having a different constellation generated using the NN model.

Referring to diagram 800, the base station 804 may take information bits 812 from higher layers and utilize the NN model 810 to generate such bits for the channel 806 to TBs and CBs thereof. That is, the NN model 810 may use as inputs network-side channel knowledge 808 and the information bits 812 to (i) determine the constellation for a given CB of a TB by which the information bits 812 are to be transmitted via the channel 806, and (ii) determine the CB channel coding rate (per RE, RB, PRG), based at least on the channel knowledge 808. The base station 804 may then perform processing 814 (e.g., constellation mapping, rate matching, and channel coding) for the TBs/CBs, and may transmit the processed TBs/CBs over the channel 806 that may introduce noise into the communication. The UE 802 may then receive, over the channel 806, the transmitted data and perform a channel estimation 816 that is provided to the NN model 810'. Because the UE 802 and the base station 804 both have channel knowledge of the channel 806, the inputs to the NN model 810 and the NN model 810' may be the same or approximately the same (e.g., within a tolerance or threshold by which consistent NN model outputs may be obtained). The UE 802 may provide the received data to a receiver 818 that generates decoded information bits 820 from the received data based on the NN model 810' (e.g., using the communication configuration 824, as described herein). Likewise, the UE 802 may be configured to transmit a CB of a TB to the base station 804. The CB of the TB may be transmitted based on the communication configuration 824 associated with the NN model 810' in association with the other instance of the NN model for the base station 804 (e.g., the NN model 810).

Figure 12:
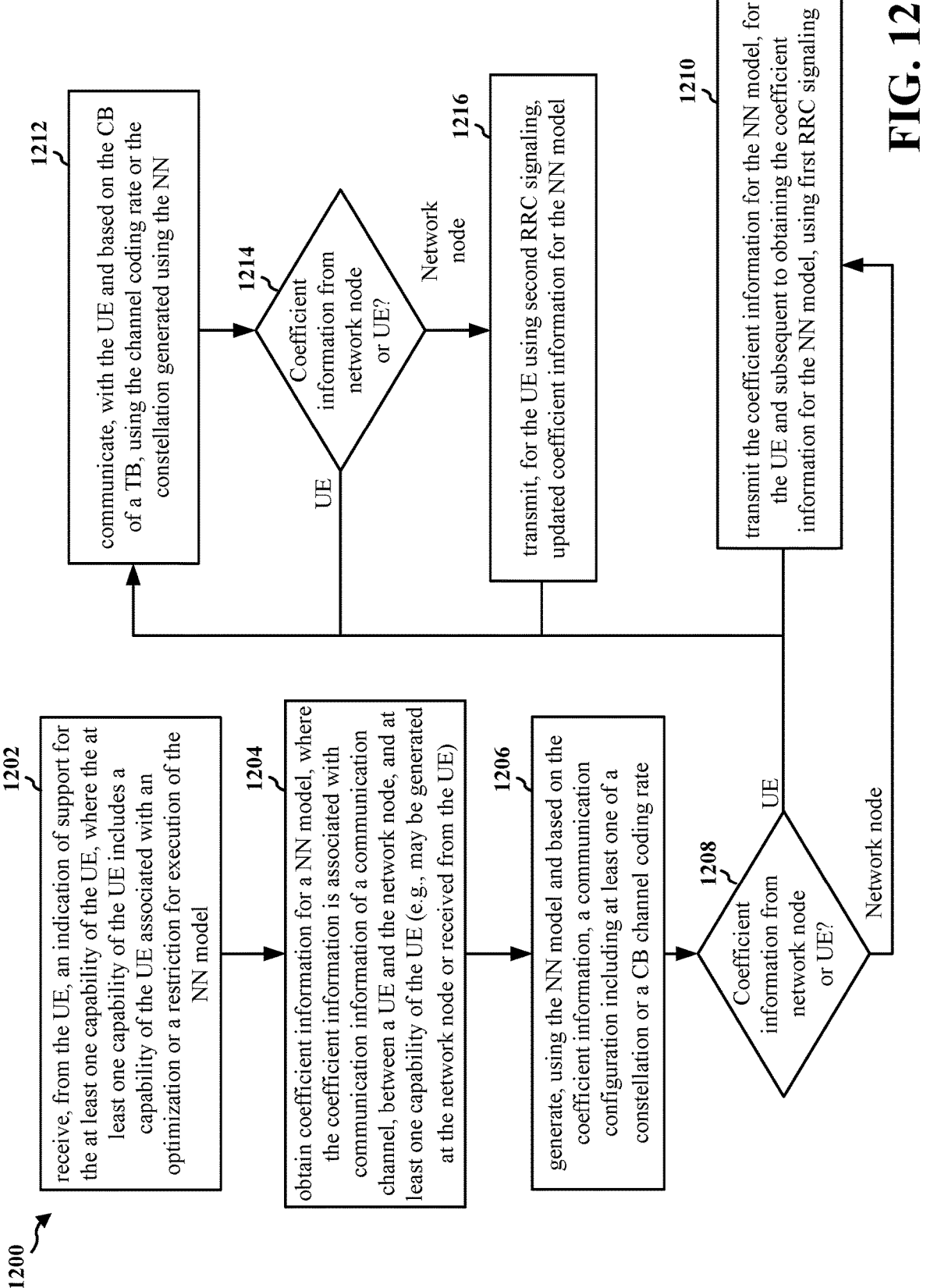
FIG. 12 is a flowchart of a method of wireless communication, in accordance with various aspects of the present disclosure.

FIG. 12 is a flowchart 1200 of a method of wireless communication, in various aspects. The method may be performed by a base station (e.g., the base station 102, 504, 604, 704, 804; the network entity 1302, 1402). In some aspects, the method may include aspects described in connection with the communication flow in FIG. 7 and/or aspects described in FIGS. 5, 6, 8. The method provides for ML based dynamic bit loading and channel coding rate control that enables using deep-learning based selections of bit loading and dynamic channel code rates to increase spectral efficiency and granularity of CB channel coding rate per CB, as well as of constellations for each layer of multiple layers, for each RE of multiple REs, for each RB of multiple RBs, and/or for each PRG of multiple PRGs, that enables adapting NN-based implementations and training for bit loading and channel coding rate control to optimize receiver performance based on channel conditions while minimizing the signaling impact and latency of such signaling, and that enables communicating NN coefficients between a transmitter and a receiver for cross-training of the network side, as well as for reductions of the signaling overhead and latency.

At 1202, the base station receives, from the UE, an indication of support for the at least one capability of the UE, where the at least one capability of the UE includes a capability of the UE associated with an optimization or a restriction for execution of the NN model. As an example, the reception may be performed, at least in part, by the component 199. FIGS. 7, 8 illustrate an example of the base station 704 receiving such an indication of support from a UE (e.g., the UE 702).

The UE 702 may be configured to provide an indication of at least one capability of the UE (e.g., a UE capability 706) to the base station 704. The UE capability 706 may indicate support/capabilities of the UE 702 associated with an optimization or a restriction for execution of a NN model.

At 1204, the base station obtains coefficient information for a NN model, where the coefficient information is associated with communication information of a communication channel, between a UE and the network node, and at least one capability of the UE. As an example, the obtainment may be performed, at least in part, by the component 199. FIGS. 7, 8 illustrate an example of the base station 704 obtaining such coefficient information. FIG. 15 illustrates example aspects of model training.

The base station 704 may be configured to obtain (at 708) coefficient information 709 for a NN model, where the coefficient information 709 is associated with communication information of a communication channel, between the UE 702 and the base station 704, and at least one capability of the UE (e.g., the UE capability 706). The UE 702 may be configured to obtain (at 708) the coefficient information for the NN model by generating or selecting the coefficient information 709 for the NN model based on a ML training associated with communication information of the communication channel and the at least one capability of the UE 702 (e.g., the UE capability 706). FIG. 15 illustrates example aspects of model inference.

In diagram 800 of FIG. 8, an ML trainer or the like may enable the base station 804 to train a NN model 810 based on communication information of the communication channel 806, as well as its own receiver implementation and/or criteria associated with the capabilities of the UE 802 (such as the UE capability 706, noted above). The UE 802 may also be configured, as similarly described for the UE 702, to provide/transmit these capabilities of the UE 802 to the base station 804. In aspects, the UE 802 may have its own respective instance of the NN model 810, e.g., a NN model 810'. In some aspects, the base station 804 may provide, as inputs for an ML trainer, information/data associated with channel knowledge 808 and with the receiver of the base station 804. The channel knowledge 808 may include SRS/UE reporting-based network-side channel knowledge, e.g., for the communication channel 806, and may be used to generate, select, obtain, etc., the coefficient information 822. The base station 804 may be configured to provide coefficient information 822, which may be utilized by the UE 802 for the NN model 810' and by the base station 804 for the NN model 810. The base station 804 may thus generate the NN model 810 using the coefficient information 822, the channel knowledge 808, receiver implementation, and/or criteria associated with the capabilities of the UE 802.

At 1206, the base station generates, using the NN model and based on the coefficient information, a communication configuration including at least one of a constellation or a CB channel coding rate. As an example, the generation may be performed, at least in part, by the component 199. FIGS. 7, 8 illustrate an example of the base station 704 generating such a communication configuration.

The base station 704 may be configured to generate (at 710), using the NN model and based on the coefficient information, a communication configuration including at least one of a constellation or a CB channel coding rate. That is, the base station 704 may be configured to generate/obtain, from the NN model as outputs, at least one of the constellation or the CB channel coding rate for the communication configuration. In aspects, the base station 704 may thus obtain constellations for each layer of multiple layers, for each RE of multiple REs, for each RB of multiple RBs, and/or for each PRG of multiple PRGs, and may obtain individual CB channel coding rates for each of the CBs of a given TB.

In diagram 800, the NN model 810 of the base station 704 may be configured to generate a communication configuration 824. The communication configuration 824 may be applied to a receiver/transmitter of the base station 704 to communicate, with the UE 802 and based on the CB of a TB using the CB channel coding rate or the constellation generated using the NN model 810. In furtherance of the above in the context of diagram 800, the ML trainer 612 may be configured to provide as its output(s) coefficient information 822 associated with the NN model 810, which may be utilized by the UE 802 for the NN model 810'. The base station 804 may be configured to provide the coefficient information 822 to the UE 802.

At 1208, it may be determined (e.g., via configuration) if the coefficient information is obtained from the network node or from the UE. That is, a determination may be made as to whether the network node or the UE configures the NN model. As an example, the determination may be performed, at least in part, by the component 199. If it is the UE, flowchart 1200 continues to 1212. If it is the network node, flowchart 1000 continues to 1210.

At 1210, the base station transmits the coefficient information for the NN model, for the UE and subsequent to obtaining the coefficient information for the NN model, using first RRC signaling. As an example, the transmission may be performed, at least in part, by the component 199. FIGS. 7, 8 illustrate an example of the base station 704 transmitting such coefficient information for a UE (e.g., the UE 702).

The base station 704 may be configured to transmit, for the UE 702, the coefficient information 709 associated with the NN model subsequent to obtaining the coefficient information 709 for the NN model. The base station 704 may be configured to transmit the coefficient information 709 to the UE 702 using RRC signaling. In the context of diagram 800, the ML trainer 612 may be configured to provide as its output(s) coefficient information 822 associated with the NN model 810, which may be utilized by the UE 802 for the NN model 810'. The base station 804 may be configured to provide the coefficient information 822 to the UE 802.

At 1212, the base station communicates, with the UE and based on the CB of a TB, using the channel coding rate or the constellation generated using the NN. As an example, the communication may be performed, at least in part, by the component 199. FIGS. 7, 8 illustrate an example of the base station 704 communicating with a UE (e.g., the UE 702).

The UE 702 and the base station 704 in call flow diagram 700 may be configured to communicate (e.g., a communication 714 such as transmissions and/or receptions of data), with each other, e.g., based on the CB of a TB, using the CB channel coding rate or the constellation generated using the NN model. The UE 702/the base station 704 may be configured, during the communication 714 (e.g., transmission/reception) to transmit/receive an additional CB of the TB for each other. The additional CB may include at least one of a different CB channel coding rate or a different coding rate generated using the NN model, and/or may include at least one of an additional layer, an additional RE, an additional RB, or an additional PRG, of the additional CB having a different constellation generated using the NN model.

Referring to diagram 800, the base station 804 may take information bits 812 from higher layers and utilize the NN model 810 to generate such bits for the channel 806 to TBs and CBs thereof. That is, the NN model 810 may use as inputs network-side channel knowledge 808 and the information bits 812 to (i) determine the constellation for a given CB of a TB by which the information bits 812 are to be transmitted via the channel 806, and (ii) determine the CB channel coding rate (per RE, RB, PRG), based at least on the channel knowledge 808. The base station 804 may then perform processing 814 (e.g., constellation mapping, rate matching, and channel coding) for the TBs/CBs, and may transmit the processed TBs/CBs over the channel 806 that may introduce noise into the communication. The UE 802 may then receive, over the channel 806, the transmitted data and perform a channel estimation 816 that is provided to the NN model 810'. Because the UE 802 and the base station 804 both have channel knowledge of the channel 806, the inputs to the NN model 810 and the NN model 810' may be the same or approximately the same (e.g., within a tolerance or threshold by which consistent NN model outputs may be obtained). The UE 802 may provide the received data to a receiver 818 that generates decoded information bits 820 from the received data based on the NN model 810' (e.g., using the communication configuration 824, as described herein). Likewise, the UE 802 may be configured to transmit a CB of a TB to the base station 804. The CB of the TB may be transmitted based on the communication configuration 824 associated with the NN model 810' in association with the other instance of the NN model for the base station 804 (e.g., the NN model 810).

At 1214, it may be determined (e.g., via configuration) if the coefficient information is obtained from the network node or from the UE. That is, a determination may be made as to whether the network node or the UE configures the NN model. In aspects, the determination at 1014 may be performed based on changes to channel conditions, e.g., which may lead to adjustments/retraining of coefficient information for updated coefficient information (e.g., by reperforming 1204 and/or 1206). As an example, the determination may be performed, at least in part, by the component 199. If it is the network node/base station, flowchart 1200 continues to 1016. If it is the network node, flowchart 1000 continues back to 1212.

At 1216, the base station transmits, for the UE using second RRC signaling, updated coefficient information for the NN model. As an example, the transmission may be performed, at least in part, by the component 199. FIGS. 7, 8 illustrate an example of the base station 704 transmitting such updated coefficient information for a UE (e.g., the UE 702).

The base station 704 may be configured to transmit, for the UE 702, updated coefficient information 716 for the NN model. In aspects, the updated coefficient information 716 may be transmitted using RRC signaling. The base station 704 may be configured to provide/transmit the updated coefficient information 716 to the UE 702 based on changes in channel conditions and/or the like, according to aspects. Referring to diagram 800, the base station 804 may, e.g., by subsequent acquisition of network-side channel knowledge 808, be configured to determine a change in the condition of the communication channel 806. The base station 804 may be configured to input the subsequent knowledge into the NN model 810', which may cause an update of the communication configurations for the base station 804, and a corresponding update/retraining for the coefficient information 822 which may propagate back to the NN model 810' and the NN model 810.

Figure 13:
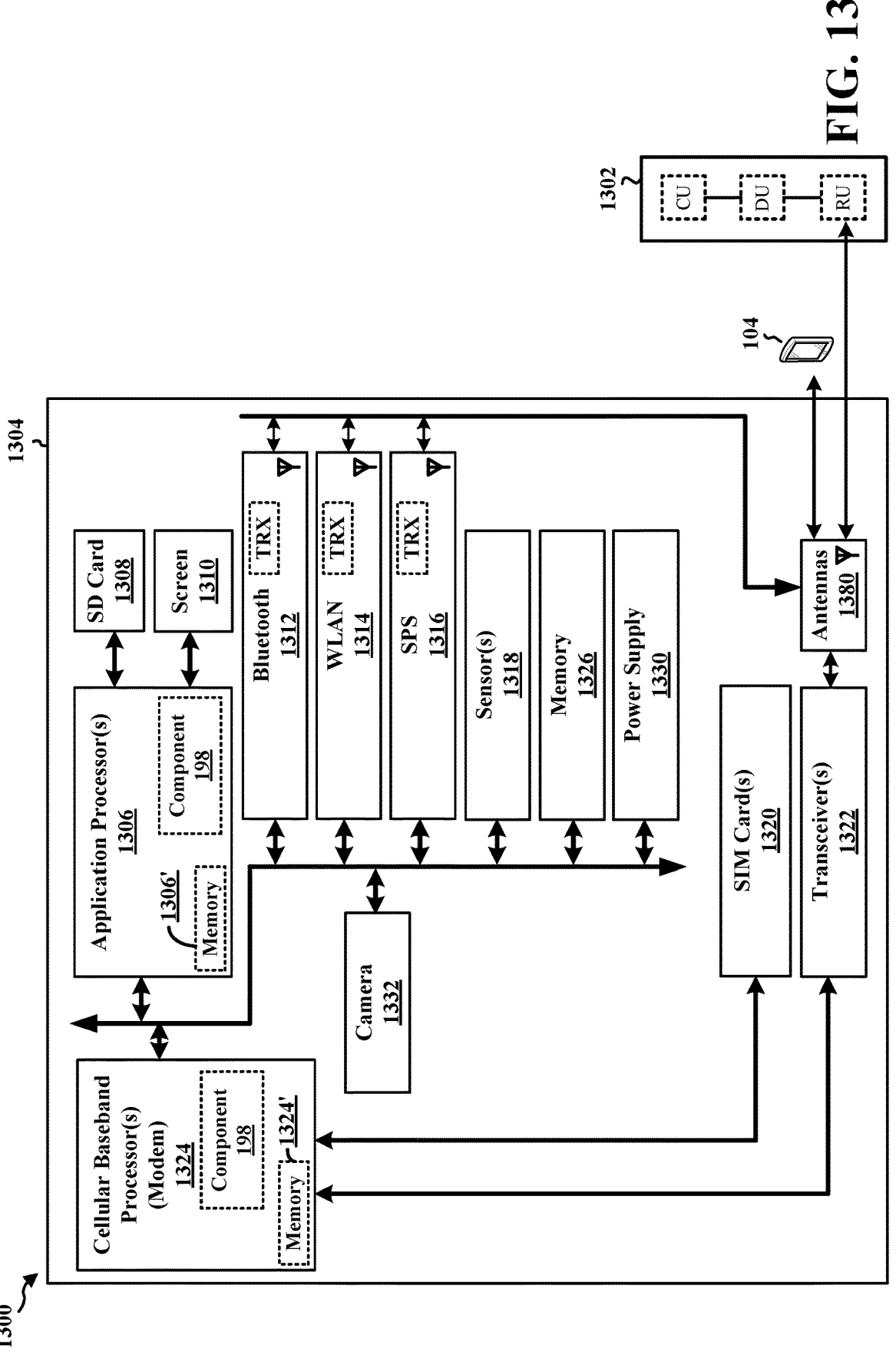
FIG. 13 is a diagram illustrating an example of a hardware implementation for an example apparatus and/or UE.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor 1324 (also referred to as a modem) coupled to one or more transceivers 1322 (e.g., cellular RF transceiver). The cellular baseband processor(s) 1324 may include at least one on-chip memory 1324'. In some aspects, the apparatus 1304 may further include one or more subscriber identity modules (SIM) cards 1320 and at least one application processor 1306 coupled to a secure digital (SD) card 1308 and a screen 1310. The application processor(s) 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) 1324 communicates through the transceiver(s) 1322 via one or more antennas 1380 with the UE 104 and/or with an RU associated with a network entity 1302. The cellular baseband processor(s) 1324 and the application processor(s) 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor(s) 1324 and the application processor(s) 1306 are each responsible for general processing, including the execution of software stored on the computer-readable medium/memory. The software, when executed by the cellular baseband processor(s) 1324/application processor(s) 1306, causes the cellular baseband processor(s) 1324/application processor(s) 1306 to perform the various functions described supra. The computer-readable medium/memory may also be used for storing data that is manipulated by the cellular baseband processor(s) 1324/ application processor(s) 1306 when executing software. The cellular baseband processor(s) 1324/application processor(s) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) 1324 and/or the application processor(s) 1306, and in another configuration, the apparatus 1304 may be the entire UE (e.g., see UE 350 of FIG. 3) and include the additional modules of the apparatus 1304.

As discussed supra, the component 198 may be configured to obtain coefficient information for a NN model, where the coefficient information is associated with communication information of a communication channel, between the UE and a network node, and at least one capability of the UE. The component 198 may be configured to generate, using the NN model and based on the coefficient information, a communication configuration including at least one of a constellation or a CB channel coding rate. The component 198 may be configured to communicate, with the network node and based on the CB of a TB, using the CB channel coding rate or the constellation generated using the NN model. The component 198 may be configured to transmit, to the network node, an indication of support for the at least one capability of the UE, where the at least one capability of the UE includes a capability of the UE associated with an optimization or a restriction for execution of the NN model. The component 198 may be configured to receive, from the network node using second RRC signaling, updated coefficient information for the NN model. The component 198 may be configured to transmit, for the network node and subsequent to obtaining the coefficient information for the NN model, the coefficient information associated with the NN model. The component 198 may be further configured to perform any of the aspects described in connection with the flowcharts in any of FIGS. 10-13, and/or any of the aspects performed by a UE for any of FIGS. 5-9. The component 198 may be within the cellular baseband processor(s) 1324, the application processor(s) 1306, or both the cellular baseband processor(s) 1324 and the application processor(s) 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) 1324 and/or the application processor(s) 1306, may include means for obtaining coefficient information for a NN model, where the coefficient information is associated with communication information of a communication channel, between the UE and a network node, and at least one capability of the UE. In the configuration, the apparatus 1304, and in particular the cellular baseband processor(s) 1324 and/or the application processor(s) 1306, may include means for generating, using the NN model and based on the coefficient information, a communication configuration including at least one of a constellation or a CB channel coding rate. In the configuration, the apparatus 1304, and in particular the cellular baseband processor(s) 1324 and/or the application processor(s) 1306, may include means for communicating, with the network node and based on the CB of a TB, using the CB channel coding rate or the constellation generated using the NN model. In one configuration, the apparatus 1304, and in particular the cellular baseband processor(s) 1324 and/or the application processor(s) 1306, may include means for transmitting, to the network node, an indication of support for the at least one capability of the UE, where the at least one capability of the UE includes a capability of the UE associated with an optimization or a restriction for execution of the NN model. In one configuration, the apparatus 1304, and in particular the cellular baseband processor(s) 1324 and/or the application processor(s) 1306, may include means for receiving, from the network node using second RRC signaling, updated coefficient information for the NN model. In one configuration, the apparatus 1304, and in particular the cellular baseband processor(s) 1324 and/or the application processor(s) 1306, may include means for transmitting, for the network node and subsequent to obtaining the coefficient information for the NN model, the coefficient information associated with the NN model. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
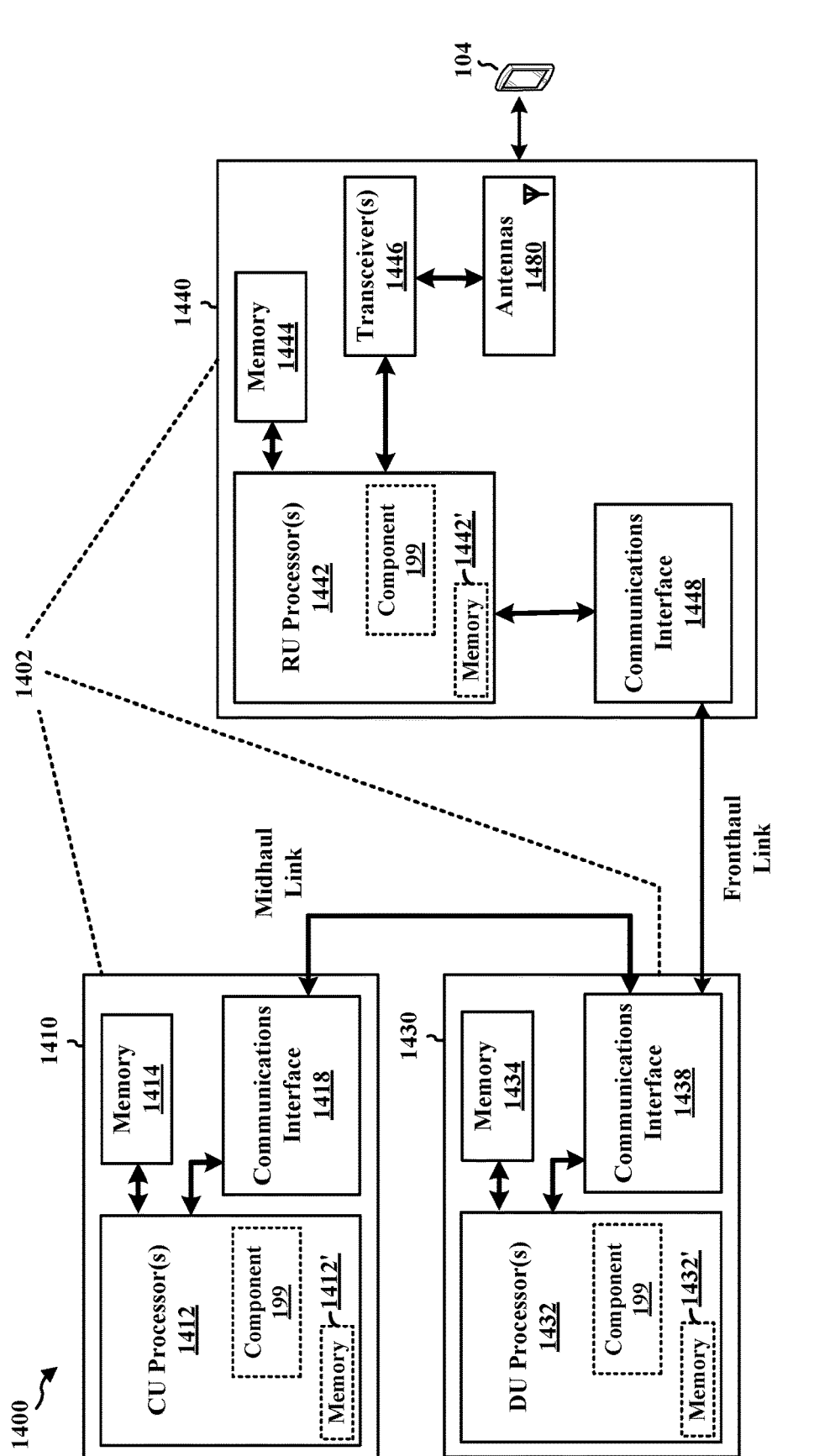
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include at least one CU processor 1412. The CU processor(s) 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include at least one DU processor 1432. The DU processor(s) 1432 may include on-chip memory 1432'. In some aspects, the DU 1430 may further include additional memory modules 1434 and a communications interface 1438. The DU 1430 communicates with the RU 1440 through a fronthaul link. The RU 1440 may include at least one RU processor 1442. The RU processor(s) 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to obtain coefficient information for a NN model, where the coefficient information is associated with communication information of a communication channel, between a UE and the network node, and at least one capability of the UE. The component 199 may be configured to generate, using the NN model and based on the coefficient information, a communication configuration including at least one of a constellation or a CB channel coding rate. The component 199 may be configured to communicate, with the UE and based on the CB of a TB, using the channel coding rate or the constellation generated using the NN. The component 199 may be configured to receive, from the UE, an indication of support for the at least one capability of the UE, where the at least one capability of the UE includes a capability of the UE associated with an optimization or a restriction for execution of the NN model. The component 199 may be configured to transmit the coefficient information for the NN model, for the UE and subsequent to obtaining the coefficient information for the NN model, using first RRC signaling. The component 199 may be configured to transmit, for the UE using second RRC signaling, updated coefficient information for the NN model. The component 199 may be further configured to perform any of the aspects described in connection with the flowcharts in any of FIGS. 10-13, and/or any of the aspects performed by a UE for any of FIGS. 5-9. The component 199 may be within one or more processors of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1402 may include a variety of components configured for various functions. In one configuration, the network entity 1402 may include means for obtaining coefficient information for a NN model, where the coefficient information is associated with communication information of a communication channel, between a UE and the network node, and at least one capability of the UE. In the configuration, the network entity 1402 may include means for generating, using the NN model and based on the coefficient information, a communication configuration including at least one of a constellation or a CB channel coding rate. In the configuration, the network entity 1402 may include means for communicating, with the UE and based on the CB of a TB, using the channel coding rate or the constellation generated using the NN. In one configuration, the network entity 1402 may include means for receiving, from the UE, an indication of support for the at least one capability of the UE, where the at least one capability of the UE includes a capability of the UE associated with an optimization or a restriction for execution of the NN model. In one configuration, the network entity 1402 may include means for transmitting the coefficient information for the NN model, for the UE and subsequent to obtaining the coefficient information for the NN model, using first RRC signaling. In one configuration, the network entity 1402 may include means for transmitting, for the UE using second RRC signaling, updated coefficient information for the NN model. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Wireless devices may communicate with the networks utilizing bit loading and channel coding rates for data. For instance, in 5G NR, there may be up to two TBs as a maximum, and one TB when number of layers is smaller or equal to four. In such configurations, each TB may be partitioned to CBs that have the same constellation and the same channel coding rate. This information may be indicated to a UE by the MCS using DCI. However, using the same constellation and channel code rate for all CBs of a given TB is sub-optimal, while it may provide a fair balance between performance and signaling overhead. Further, improved schemes to control the constellation as a function of the channel, and control of the channel code rate, may increase solution complexity. As one example, such solutions may have to overcome or account for many variables, including but not limited to, instantaneous channels per RE, decoder implementation details, overall achievable rates considering all REs inside a CB, interlayer interference between different layers as a function of different constellation selections, and/or the like.

The aspects herein for ML based dynamic bit loading and channel coding rate control provide for using deep-learning based selections of bit loading and dynamic channel code rates to increase spectral efficiency and granularity of CB channel coding rate per CB, as well as of constellations for each layer of multiple layers, for each RE of multiple REs, for each RB of multiple RBs, and/or for each PRG of multiple PRGs. Aspects also provide for adapting NN-based implementations and training for bit loading and channel coding rate control to optimize receiver performance based on channel conditions while minimizing the signaling impact and latency of such signaling. Aspects further provide for communicating NN coefficients between a transmitter and a receiver for cross-training of the network side, as well as for reductions of the signaling overhead and latency.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: obtaining coefficient information for a neural network (NN) model, wherein the coefficient information is associated with communication information of a communication channel, between the UE and a network node, and at least one capability of the UE; generating, using the NN model and based on the coefficient information, a communication configuration including at least one of a constellation or a code block (CB) channel coding rate; and communicating, with the network node and based on the CB of a transport block (TB) using the CB channel coding rate or the constellation generated using the NN model.

Aspect 2 is the method of aspect 1, wherein generating the communication configuration includes generating a set of CB channel coding rates for the CB of the TB, and the CB of the TB uses a first CB channel coding rate or a second coding rate of the set of CB channel coding rates for the CB.

Aspect 3 is the method of any of aspects 1 and 2, wherein generating the communication configuration includes generating a constellations for each layer of multiple layers, for each resource element (RE) of multiple REs, for each resource block (RB) of multiple RBs, or for each physical resource block group (PRG) of multiple PRGs.

Aspect 4 is the method of any of aspects 1 to 3, wherein generating the communication configuration comprises: providing, to the NN model as inputs, at least one of a channel estimation associated with a reference signal or a noise indication for the communication channel; and obtaining, from the NN model as outputs, at least one of the constellation or the CB channel coding rate for the communication configuration.

Aspect 5 is the method of aspect 4, wherein at least one of the channel estimation or the noise indication for the communication channel are associated with at least one signal transmitted by the network node to the UE using the communication channel.

Aspect 6 is the method of any of aspects 1 to 5, further comprising: transmitting, to the network node, an indication of support for the at least one capability of the UE, wherein the at least one capability of the UE includes a capability of the UE associated with an optimization or a restriction for execution of the NN model.

Aspect 7 is the method of any of aspects 1 to 6, wherein communicating, with the network node and based on the communication configuration, the CB of the TB comprises at least one of: receiving the CB of the TB from the network node, wherein the CB of the TB is received based on the communication configuration that is also associated with another instance of the NN model for the network node; or transmitting the CB of the TB to the network node, wherein the CB of the TB is transmitted based on the communication configuration in association with the another instance of the NN model for the network node.

Aspect 8 is the method of aspect 7, wherein communicating, with the network node and based on the communication configuration, the CB of the TB comprises transmitting the CB of the TB to the network node; wherein transmitting the CB of the TB to the network node comprises: transmitting an additional CB of the TB to the network node, wherein the additional CB of the TB includes at least one of: a different CB channel coding rate or a different coding rate generated using the NN model; or at least one of an additional layer, an additional RE, an additional RB, or an additional PRG, of the additional CB having a different constellation generated using the NN model.

Aspect 9 is the method of any of aspects 1 to 8, wherein obtaining the coefficient information for the NN model comprises: receiving the coefficient information for the NN model from the network node using first radio resource control (RRC) signaling.

Aspect 10 is the method of aspect 9, further comprising: receiving, from the network node using second RRC signaling, updated coefficient information for the NN model.

Aspect 11 is the method of any of aspects 1 to 8, wherein obtaining the coefficient information for the NN model comprises at least one of generating or selecting, at the UE, the coefficient information for the NN model based on a machine learning (ML) training associated with the communication information of the communication channel and the at least one capability of the UE.

Aspect 12 is the method of aspect 11, further comprising: transmitting, for the network node and subsequent to obtaining the coefficient information for the NN model, the coefficient information associated with the NN model.

Aspect 13 is the method of aspect 12, wherein obtaining the coefficient information for the NN model comprises: transmitting, for the network node using first radio resource control (RRC) signaling, an initial set of coefficient options for the coefficient information associated with the NN model, wherein the initial set of coefficient options includes at least one option for the coefficient information; receiving, from the network node, at least a portion of the initial set of coefficient options for the coefficient information associated with the NN model; and selecting the coefficient information from at least the portion of the initial set of coefficient options for the coefficient information associated with the NN model; wherein the coefficient information associated with the NN model is transmitted using second RRC.

Aspect 14 is the method of aspect 13, wherein at least the portion of the initial set of coefficient options for the coefficient information associated with the NN model includes a subset of the initial set of coefficient options that is down-selected from the initial set of coefficient options, and wherein at least the portion of the initial set of coefficient options for the coefficient information associated with the NN model is received using at least one of a medium access control (MAC) control element (MAC-CE) or downlink control information (DCI); or wherein each coefficient option of the initial set of coefficient options corresponds to a respective index of a trained or defined coefficient option.

Aspect 15 is a method of wireless communication at a network node, comprising: obtaining coefficient information for a neural network (NN) model, wherein the coefficient information is associated with communication information of a communication channel, between a user equipment (UE) and the network node, and at least one capability of the UE; generating, using the NN model and based on the coefficient information, a communication configuration including at least one of a constellation or a code block (CB) channel coding rate; and communicating, with the UE and based on the CB of a transport block (TB) using the channel coding rate or the constellation generated using the NN.

Aspect 16 is the method of aspect 15, wherein generating the communication configuration includes generating a set of CB channel coding rates for the CB of the TB, and the CB of the TB uses a first CB channel coding rate or a second coding rate of the set of CB channel coding rates for the CB.

Aspect 17 is the method of any of aspects 15 and 16, wherein generating the communication configuration includes generating a constellations for each layer of multiple layers, for each resource element (RE) of multiple REs, for each resource block (RB) of multiple RBs, or for each physical resource block group (PRG) of multiple PRGs.

Aspect 18 is the method of any of aspects 15 to 17, wherein generating the communication configuration comprises: providing, to the NN model as inputs, at least one of a channel estimation associated with a reference signal or a noise indication for the communication channel; and obtaining, from the NN model as outputs, at least one of the constellation or the CB channel coding rate for the communication configuration.

Aspect 19 is the method of aspect 18, wherein at least one of the channel estimation or the noise indication for the communication channel are associated with at least one signal transmitted by the UE to the network node using the communication channel.

Aspect 20 is the method of any of aspects 15 to 19, further comprising: receiving, from the UE, an indication of support for the at least one capability of the UE, wherein the at least one capability of the UE includes a capability of the UE associated with an optimization or a restriction for execution of the NN model.

Aspect 21 is the method of any of aspects 15 to 20, wherein communicating, with the UE and based on the communication configuration, the CB of the TB comprises at least one of: transmitting the CB of the TB for the UE, wherein the CB of the TB is transmitted based on the communication configuration that is also associated with another instance of the NN model for the UE; or receiving the CB of the TB from the UE, wherein the CB of the TB is received based on the communication configuration in association with the another instance of the NN model for the UE.

Aspect 22 is the method of aspect 21, wherein communicating, with the UE and based on the communication configuration, the CB of the TB comprises transmitting the CB of the TB to the UE; wherein transmitting the CB of the TB to the UE comprises: transmitting an additional CB of the TB to the UE, wherein the additional CB of the TB includes at least one of: a different CB channel coding rate or a different coding rate generated using the NN model; or at least one of an additional layer, an additional RE, an additional RB, or an additional PRG, of the additional CB having a different constellation generated using the NN model.

Aspect 23 is the method of any of aspects 15 to 22, further comprising: transmitting the coefficient information for the NN model, for the UE and subsequent to obtaining the coefficient information for the NN model, using first radio resource control (RRC) signaling.

Aspect 24 is the method of aspect 23, further comprising: transmitting, for the UE using second RRC signaling, updated coefficient information for the NN model.

Aspect 25 is the method of any of aspects 15 to 22, wherein obtaining the coefficient information for the NN model comprises at least one of generating or selecting, at the network node, the coefficient information for the NN model based on a machine learning (ML) training associated with the communication information of the communication channel and the at least one capability of the UE.

Aspect 26 is the method of aspect 25, wherein obtaining the coefficient information for the NN model comprises: receiving, from the UE, the coefficient information associated with the NN model.

Aspect 27 is the method of aspect 26, wherein obtaining the coefficient information for the NN model comprises: receiving, from the UE using first radio resource control (RRC) signaling, an initial set of coefficient options for the coefficient information associated with the NN model, wherein the initial set of coefficient options includes at least one option for the coefficient information; and transmitting, for the UE, at least a portion of the initial set of coefficient options for the coefficient information associated with the NN model, wherein the coefficient information is included in the at least the portion of the initial set of coefficient options for the coefficient information associated with the NN model; wherein the coefficient information associated with the NN model is received using second RRC.

Aspect 28 is the method of aspect 27, wherein at least the portion of the initial set of coefficient options for the coefficient information associated with the NN model includes a subset of the initial set of coefficient options that is down-selected from the initial set of coefficient options, and wherein at least the portion of the initial set of coefficient options for the coefficient information associated with the NN model is transmitted using at least one of a medium access control (MAC) control element (MAC-CE) or downlink control information (DCI); or wherein each coefficient option of the initial set of coefficient options corresponds to a respective index of a trained or defined coefficient option.

Aspect 29 is an apparatus for wireless communication including means for implementing any of aspects 1 to 15.

Aspect 30 is a computer-readable medium (e.g., a non-transitory computer-readable medium) storing computer executable code, the code when executed by at least one processor causes the at least one processor to implement any of aspects 1 to 15.

Aspect 31 is an apparatus for wireless communication at a network node. The apparatus includes a memory; and at least one processor coupled to the memory and, based at least in part on information stored in the memory, the at least one processor is configured to implement any of aspects 1 to 15.

Aspect 32 is the apparatus of aspect 31, further including at least one of a transceiver or an antenna coupled to the at least one processor.

Aspect 33 is an apparatus for wireless communication including means for implementing any of aspects 16 to 28.

Aspect 34 is a computer-readable medium (e.g., a non-transitory computer-readable medium) storing computer executable code, the code when executed by at least one processor causes the at least one processor to implement any of aspects 16 to 28.

Aspect 35 is an apparatus for wireless communication at a network node. The apparatus includes a memory; and at least one processor coupled to the memory and, based at least in part on information stored in the memory, the at least one processor is configured to implement any of aspects 16 to 28.

Aspect 36 is the apparatus of aspect 35, further including at least one of a transceiver or an antenna coupled to the at least one processor.

What is claimed is:

1. An apparatus for wireless communication at a user equipment (UE), comprising:
at least one memory; and
at least one processor coupled to the at least one memory and, based at least in part on information stored in the at least one memory, the at least one processor, individually or in any combination, is configured to:
obtain coefficient information for a neural network (NN) model, wherein the coefficient information is associated with communication information of a communication channel, between the UE and a network node, and at least one capability of the UE;
generate, using the NN model and based on the coefficient information, a communication configuration including at least one of a constellation or a code block (CB) channel coding rate; and
communicate, with the network node and based on the CB of a transport block (TB), using the CB channel coding rate or the constellation generated using the NN model;
wherein to communicate, with the network node and based on the communication configuration, the CB of the TB, the at least one processor, individually or in any combination, is configured to:
receive the CB of the TB from the network node, wherein the CB of the TB is received based on the communication configuration that is also associated with another instance of the NN model for the network node; or
transmit the CB of the TB to the network node, wherein the CB of the TB is transmitted based on the communication configuration in association with the another instance of the NN model for the network node; and
wherein to transmit the CB of the TB to the network node, the at least one processor, individually or in any combination, is configured to:

transmit an additional CB of the TB to the network node, wherein the additional CB of the TB includes at least one of:
a different CB channel coding rate or a different coding rate generated using the NN model; or
at least one of an additional layer, an additional RE, an additional RB, or an additional PRG, of the additional CB having a different constellation generated using the NN model.

2. The apparatus of claim 1, wherein to generate the communication configuration, the at least one processor, individually or in any combination, is configured to generate a set of CB channel coding rates for the CB of the TB, and the CB of the TB uses a first CB channel coding rate or a second coding rate of the set of CB channel coding rates for the CB.

3. The apparatus of claim 1, wherein to generate the communication configuration, the at least one processor, individually or in any combination, is configured to generate a constellations for each layer of multiple layers, for each resource element (RE) of multiple REs, for each resource block (RB) of multiple RBs, or for each physical resource block group (PRG) of multiple PRGs.

4. The apparatus of claim 1, wherein to generate the communication configuration, the at least one processor, individually or in any combination, is configured to:
provide, to the NN model as inputs, at least one of a channel estimation associated with a reference signal or a noise indication for the communication channel; and
obtain, from the NN model as outputs, at least one of the constellation or the CB channel coding rate for the communication configuration.

5. The apparatus of claim 4, wherein at least one of the channel estimation or the noise indication for the communication channel are associated with at least one signal transmitted by the network node to the UE using the communication channel.

6. The apparatus of claim 1, wherein the at least one processor, individually or in any combination, is further configured to:
transmit, to the network node, an indication of support for the at least one capability of the UE, wherein the at least one capability of the UE includes a capability of the UE associated with an optimization or a restriction for execution of the NN model.

7. The apparatus of claim 1, wherein to obtain the coefficient information for the NN model, the at least one processor, individually or in any combination, is configured to:
receive the coefficient information for the NN model from the network node using first radio resource control (RRC) signaling.

8. The apparatus of claim 7, wherein the at least one processor, individually or in any combination, is further configured to:
receive, from the network node using second RRC signaling, updated coefficient information for the NN model.

9. The apparatus of claim 1, wherein to obtain the coefficient information for the NN model, the at least one processor, individually or in any combination, is configured to generate or select, at the UE, the coefficient information for the NN model based on a machine learning (ML) training associated with the communication information of the communication channel and the at least one capability of the UE.

10. The apparatus of claim 9, wherein the at least one processor, individually or in any combination, is further configured to:

transmit, for the network node and subsequent to obtaining the coefficient information for the NN model, the coefficient information associated with the NN model.

11. The apparatus of claim 10, wherein to obtain the coefficient information for the NN model, the at least one processor, individually or in any combination, is configured to:

transmit, for the network node using first radio resource control (RRC) signaling, an initial set of coefficient options for the coefficient information associated with the NN model, wherein the initial set of coefficient options includes at least one option for the coefficient information;

receive, from the network node, at least a portion of the initial set of coefficient options for the coefficient information associated with the NN model; and select the coefficient information from at least the portion of the initial set of coefficient options for the coefficient information associated with the NN model;

wherein the coefficient information associated with the NN model is transmitted using second RRC.

12. The apparatus of claim 11, wherein at least the portion of the initial set of coefficient options for the coefficient information associated with the NN model includes a subset of the initial set of coefficient options that is down-selected from the initial set of coefficient options, and wherein at least the portion of the initial set of coefficient options for the coefficient information associated with the NN model is received using at least one of a medium access control (MAC) control element (MAC-CE) or downlink control information (DCI); or wherein each coefficient option of the initial set of coefficient options corresponds to a respective index of a trained or defined coefficient option.

13. An apparatus for wireless communication at a network node, comprising:

at least one memory; and at least one processor coupled to the at least one memory and, based at least in part on information stored in the at least one memory, the at least one processor, individually or in any combination, is configured to:

obtain coefficient information for a neural network (NN) model, wherein the coefficient information is associated with communication information of a communication channel, between a user equipment (UE) and the network node, and at least one capability of the UE;

generate, using the NN model and based on the coefficient information, a communication configuration including at least one of a constellation or a code block (CB) channel coding rate; and communicate, with the UE and based on the CB of a transport block (TB), using the channel coding rate or the constellation generated using the NN;

wherein to communicate, with the UE and based on the communication configuration, the CB of the TB, the at least one processor, individually or in any combination, is configured to:

transmit the CB of the TB to the UE, wherein the CB of the TB is transmitted based on the communication configuration that is also associated with another instance of the NN model for the UE; or receive the CB of the TB from the UE, wherein the CB of the TB is received based on the communication configuration in association with the another instance of the NN model for the UE; and wherein to transmit the CB of the TB to the UE, the at least one processor, individually or in any combination, is configured to:

transmit an additional CB of the TB to the UE, wherein the additional CB of the TB includes at least one of:

a different CB channel coding rate or a different coding rate generated using the NN model; or at least one of an additional layer, an additional RE, an additional RB, or an additional PRG, of the additional CB having a different constellation generated using the NN model.

14. The apparatus of claim 13, wherein to generate the communication configuration, the at least one processor, individually or in any combination, is configured to generate a set of CB channel coding rates for the CB of the TB, and the CB of the TB uses a first CB channel coding rate or a second coding rate of the set of CB channel coding rates for the CB.

15. The apparatus of claim 13, wherein to generate the communication configuration, the at least one processor, individually or in any combination, is configured to generate a constellations for each layer of multiple layers, for each resource element (RE) of multiple REs, for each resource block (RB) of multiple RBs, or for each physical resource block group (PRG) of multiple PRGs.

16. The apparatus of claim 13, wherein to generate the communication configuration, the at least one processor, individually or in any combination, is configured to:

provide, to the NN model as inputs, at least one of a channel estimation associated with a reference signal or a noise indication for the communication channel; and obtain, from the NN model as outputs, at least one of the constellation or the CB channel coding rate for the communication configuration.

17. The apparatus of claim 16, wherein at least one of the channel estimation or the noise indication for the communication channel are associated with at least one signal transmitted by the UE to the network node using the communication channel.

18. The apparatus of claim 13, wherein the at least one processor, individually or in any combination, is further configured to:

receive, from the UE, an indication of support for the at least one capability of the UE, wherein the at least one capability of the UE includes a capability of the UE associated with an optimization or a restriction for execution of the NN model.

19. The apparatus of claim 13, wherein the at least one processor, individually or in any combination, is further configured to:

transmit the coefficient information for the NN model, for the UE and subsequent to obtaining the coefficient information for the NN model, using first radio resource control (RRC) signaling.

20. The apparatus of claim 19, wherein the at least one processor, individually or in any combination, is configured to:

transmit, for the UE using second RRC signaling, updated coefficient information for the NN model.

21. The apparatus of claim 13, wherein to obtain the coefficient information for the NN model, the at least one processor, individually or in any combination, is configured to generate or select, at the network node, the coefficient information for the NN model based on a machine learning (ML) training associated with the communication information of the communication channel and the at least one capability of the UE.

22. The apparatus of claim 21, wherein to obtain the coefficient information for the NN model, the at least one processor, individually or in any combination, is configured to:

receive, from the UE and subsequent to obtaining the coefficient information for the NN model, the coefficient information associated with the NN model.

23. The apparatus of claim 22, wherein to obtain the coefficient information for the NN model, the at least one processor, individually or in any combination, is configured to:

receive, from the UE using first radio resource control (RRC) signaling, an initial set of coefficient options for the coefficient information associated with the NN model, wherein the initial set of coefficient options includes at least one option for the coefficient information; and transmit, for the UE, at least a portion of the initial set of coefficient options for the coefficient information associated with the NN model, wherein the coefficient information is included in the at least the portion of the initial set of coefficient options for the coefficient information associated with the NN model;

wherein the coefficient information associated with the NN model is received using second RRC.

24. The apparatus of claim 23, wherein at least the portion of the initial set of coefficient options for the coefficient information associated with the NN model includes a subset of the initial set of coefficient options that is down-selected from the initial set of coefficient options, and wherein at least the portion of the initial set of coefficient options for the coefficient information associated with the NN model is transmitted using at least one of a medium access control (MAC) control element (MAC-CE) or downlink control information (DCI); or wherein each coefficient option of the initial set of coefficient options corresponds to a respective index of a trained or defined coefficient option.

25. A method of wireless communication at a user equipment (UE), comprising:

obtaining coefficient information for a neural network (NN) model, wherein the coefficient information is associated with communication information of a communication channel, between the UE and a network node, and at least one capability of the UE;

generating, using the NN model and based on the coefficient information, a communication configuration including at least one of a constellation or a code block (CB) channel coding rate; and communicating, with the network node and based on the CB of a transport block (TB) using the CB channel coding rate or the constellation generated using the NN model;

wherein communicating, with the network node and based on the communication configuration, the CB of the TB, further comprises:

receiving the CB of the TB from the network node, wherein the CB of the TB is received based on the communication configuration that is also associated with another instance of the NN model for the network node; or transmitting the CB of the TB to the network node, wherein the CB of the TB is transmitted based on the communication configuration in association with the another instance of the NN model for the network node; and wherein transmitting the CB of the TB to the network node further comprises:

transmitting an additional CB of the TB to the network node, wherein the additional CB of the TB includes at least one of:

a different CB channel coding rate or a different coding rate generated using the NN model; or at least one of an additional layer, an additional RE, an additional RB, or an additional PRG, of the additional CB having a different constellation generated using the NN model.

26. A method of wireless communication at a network node, comprising:

obtaining coefficient information for a neural network (NN) model, wherein the coefficient information is associated with communication information of a communication channel, between a user equipment (UE) and the network node, and at least one capability of the UE;

generating, using the NN model and based on the coefficient information, a communication configuration including at least one of a constellation or a code block (CB) channel coding rate; and communicating, with the UE and based on the CB of a transport block (TB) using the channel coding rate or the constellation generated using the NN;

wherein communicating, with the UE and based on the communication configuration, the CB of the TB, further comprises:

transmitting the CB of the TB to the UE, wherein the CB of the TB is transmitted based on the communication configuration that is also associated with another instance of the NN model for the UE; or receiving the CB of the TB from the UE, wherein the CB of the TB is received based on the communication configuration in association with the another instance of the NN model for the UE; and wherein transmitting the CB of the TB to the UE further comprises:

transmitting an additional CB of the TB to the UE, wherein the additional CB of the TB includes at least one of:

a different CB channel coding rate or a different coding rate generated using the NN model; or at least one of an additional layer, an additional RE, an additional RB, or an additional PRG, of the additional CB having a different constellation generated using the NN model.

\*    \*    \*    \*    \*